United States Patent
Bowers et al.

(10) Patent No.: US 8,773,777 B2
(45) Date of Patent: *Jul. 8, 2014

(54) FOCUSING AND SENSING APPARATUS, METHODS, AND SYSTEMS

(75) Inventors: Jeffrey A. Bowers, Kirkland, WA (US); Roderick A. Hyde, Redmond, WA (US); Edward K. Y. Jung, Bellevue, WA (US); John Brian Pendry, Surrey (GB); David Schurig, Raleigh, NC (US); David R. Smith, Durham, NC (US); Clarence T. Tegreene, Bellevue, WA (US); Thomas A. Weaver, San Mateo, CA (US); Charles Whitmer, North Bend, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 1179 days.

This patent is subject to a terminal disclaimer.

(21) Appl. No.: 12/657,055

(22) Filed: Jan. 12, 2010

(65) Prior Publication Data

US 2010/0149660 A1 Jun. 17, 2010

Related U.S. Application Data

(63) Continuation-in-part of application No. 12/156,443, filed on May 30, 2008, now Pat. No. 8,493,669, and a continuation-in-part of application No. 12/221,201, filed on Jul. 30, 2008, now Pat. No. 7,710,664.

(51) Int. Cl.
*G02B 13/00* (2006.01)
*G02B 27/00* (2006.01)

(52) U.S. Cl.
USPC ......................................... 359/721; 359/642

(58) Field of Classification Search
USPC ......................................... 359/724, 642, 721
See application file for complete search history.

(56) References Cited

U.S. PATENT DOCUMENTS

| | | | |
|---|---|---|---|
| 3,659,111 | A | 4/1972 | Weaver et al. |
| 4,105,955 | A | 8/1978 | Hayashi et al. |
| 4,143,944 | A | 3/1979 | Takahashi |
| 4,343,000 | A | 8/1982 | Macidull |
| 4,545,653 | A | 10/1985 | Brenden et al. |
| 4,638,322 | A | 1/1987 | Lamberty |
| 4,700,196 | A | 10/1987 | Campbell et al. |
| 4,844,617 | A | 7/1989 | Kelderman et al. |

(Continued)

FOREIGN PATENT DOCUMENTS

| | | |
|---|---|---|
| CN | 1402076 A | 3/2003 |
| EP | 2 019 447 A1 | 1/2009 |

(Continued)

OTHER PUBLICATIONS

European Patent Office Search Report; App. No. EP 09 75 8706; Jan. 5, 2012; pp. 1-2.

(Continued)

*Primary Examiner* — Scott J Sugarman

(57) ABSTRACT

Apparatus, methods, and systems provide focusing, focus-adjusting, and sensing. In some approaches the focus-adjusting includes providing an extended depth of focus greater than a nominal depth of focus. In some approaches the focus-adjusting includes focus-adjusting with a transformation medium, where the transformation medium may include an artificially-structured material such as a metamaterial.

50 Claims, 8 Drawing Sheets

(56) References Cited

U.S. PATENT DOCUMENTS

| | | | |
|---|---|---|---|
| 4,872,743 A | 10/1989 | Baba et al. | |
| 4,989,006 A | 1/1991 | Roth | |
| 4,991,943 A | 2/1991 | Betensky | |
| 5,121,227 A | 6/1992 | Fisher et al. | |
| 5,161,039 A | 11/1992 | Schellenberg | |
| 5,386,215 A | 1/1995 | Brown | |
| 5,563,739 A | 10/1996 | Sato | |
| 5,774,249 A | 6/1998 | Shiraishi et al. | |
| 5,784,507 A | 7/1998 | Holm-Kennedy et al. | |
| 5,911,018 A | 6/1999 | Bischel et al. | |
| 5,956,447 A | 9/1999 | Zel'Dovich et al. | |
| 6,072,889 A | 6/2000 | Deaett et al. | |
| 6,078,946 A | 6/2000 | Johnson | |
| 6,117,517 A | 9/2000 | Diaz et al. | |
| 6,118,908 A | 9/2000 | Bischel et al. | |
| 6,335,835 B1 | 1/2002 | Koike | |
| 6,337,125 B1 | 1/2002 | Diaz et al. | |
| 6,381,072 B1 | 4/2002 | Burger | |
| 6,441,771 B1 | 8/2002 | Victora | |
| 6,456,252 B1 | 9/2002 | Goyette | |
| 6,512,483 B1 | 1/2003 | Holden et al. | |
| 6,520,643 B1 | 2/2003 | Holman et al. | |
| 6,525,875 B1 | 2/2003 | Lauer | |
| 6,597,006 B1 | 7/2003 | McCord et al. | |
| 6,690,336 B1 | 2/2004 | Leisten et al. | |
| 6,714,061 B2 | 3/2004 | Hareland | |
| 6,791,432 B2 | 9/2004 | Smith et al. | |
| 6,870,671 B2 | 3/2005 | Travis | |
| 6,965,354 B2 | 11/2005 | Pendry | |
| 6,999,044 B2 | 2/2006 | Durham et al. | |
| 7,006,052 B2 | 2/2006 | Delgado et al. | |
| 7,106,494 B2 | 9/2006 | Osipov et al. | |
| 7,218,285 B2 | 5/2007 | Davis et al. | |
| 7,265,910 B2 | 9/2007 | Ito et al. | |
| 7,339,539 B2 | 3/2008 | Joannopoulos et al. | |
| 7,348,930 B2 | 3/2008 | Lastinger et al. | |
| 7,352,941 B2 | 4/2008 | Bratkovski et al. | |
| 7,411,736 B2 | 8/2008 | Tsukagoshi | |
| 7,480,424 B2 | 1/2009 | Wang | |
| 7,489,282 B2 | 2/2009 | Lastinger et al. | |
| 7,529,030 B2 | 5/2009 | Nishioka | |
| 7,535,171 B2 | 5/2009 | Bernkopf | |
| 7,535,660 B2 | 5/2009 | Saito | |
| 7,538,946 B2 | 5/2009 | Smith et al. | |
| 7,554,741 B2 | 6/2009 | Hamada | |
| 7,643,227 B2 | 1/2010 | Nishioka | |
| 7,675,594 B2 | 3/2010 | Lee et al. | |
| 7,710,664 B2 * | 5/2010 | Bowers et al. | 359/724 |
| 7,729,199 B2 | 6/2010 | O'Connell | |
| 7,777,962 B2 | 8/2010 | Bowers et al. | |
| 7,830,618 B1 | 11/2010 | Bowers et al. | |
| 7,834,980 B2 | 11/2010 | Baselmans et al. | |
| 7,869,131 B2 | 1/2011 | Bowers et al. | |
| 7,872,812 B2 | 1/2011 | Bowers et al. | |
| 8,017,894 B2 | 9/2011 | May et al. | |
| 2002/0149534 A1 | 10/2002 | Bobier | |
| 2003/0052102 A1 | 3/2003 | Amako et al. | |
| 2003/0122729 A1 | 7/2003 | Diaz et al. | |
| 2004/0066251 A1 | 4/2004 | Eleftheriades et al. | |
| 2004/0091222 A1 | 5/2004 | Canning et al. | |
| 2004/0254474 A1 | 12/2004 | Seibel et al. | |
| 2005/0099348 A1 | 5/2005 | Pendry | |
| 2005/0221128 A1 | 10/2005 | Kochergin | |
| 2005/0225492 A1 | 10/2005 | Metz | |
| 2005/0253667 A1 | 11/2005 | Itoh et al. | |
| 2006/0028374 A1 | 2/2006 | Fullerton | |
| 2006/0039072 A1 | 2/2006 | Ruoff et al. | |
| 2006/0115212 A1 | 6/2006 | Yanik et al. | |
| 2006/0121358 A1 | 6/2006 | Rich et al. | |
| 2006/0125681 A1 | 6/2006 | Smith et al. | |
| 2006/0214113 A1 | 9/2006 | Kleinerman | |
| 2007/0109023 A1 | 5/2007 | Beausoliel et al. | |
| 2007/0124122 A1 | 5/2007 | Freier | |
| 2007/0188385 A1 | 8/2007 | Hyde et al. | |
| 2007/0188397 A1 | 8/2007 | Parsche | |
| 2007/0201805 A1 | 8/2007 | Hamada | |
| 2007/0236769 A1 | 10/2007 | Zalevsky | |
| 2007/0285314 A1 | 12/2007 | Mortazawi et al. | |
| 2008/0024792 A1 | 1/2008 | Pendry et al. | |
| 2008/0052904 A1 | 3/2008 | Schneider et al. | |
| 2008/0079638 A1 | 4/2008 | Choi et al. | |
| 2008/0165442 A1 | 7/2008 | Cai et al. | |
| 2008/0258993 A1 | 10/2008 | Gummalla et al. | |
| 2009/0040132 A1 | 2/2009 | Sridhar et al. | |
| 2009/0071537 A1 | 3/2009 | Yavuzcetin et al. | |
| 2009/0076367 A1 | 3/2009 | Sit et al. | |
| 2009/0079644 A1 | 3/2009 | May et al. | |
| 2009/0096545 A1 | 4/2009 | O'Hara et al. | |
| 2009/0109103 A1 | 4/2009 | Pendry et al. | |
| 2009/0116096 A1 | 5/2009 | Zalevsky et al. | |
| 2009/0135086 A1 | 5/2009 | Fuller et al. | |
| 2009/0218523 A1 | 9/2009 | Kare | |
| 2009/0218524 A1 | 9/2009 | Kare | |
| 2009/0285531 A1 | 11/2009 | Hirose | |
| 2009/0296076 A1 | 12/2009 | Bowers et al. | |
| 2009/0296077 A1 | 12/2009 | Bowers et al. | |
| 2009/0296226 A1 | 12/2009 | Bowers et al. | |
| 2009/0296236 A1 | 12/2009 | Bowers et al. | |
| 2009/0299683 A1 * | 12/2009 | Bowers et al. | 702/150 |
| 2010/0025599 A1 | 2/2010 | Bowers et al. | |
| 2010/0027130 A1 | 2/2010 | Bowers et al. | |
| 2010/0033712 A1 | 2/2010 | Bowers et al. | |
| 2010/0033832 A1 | 2/2010 | Bowers et al. | |
| 2010/0033833 A1 | 2/2010 | Bowers et al. | |
| 2010/0134898 A1 | 6/2010 | Shalaev et al. | |
| 2010/0156573 A1 | 6/2010 | Smith et al. | |
| 2010/0207012 A1 | 8/2010 | Hyde et al. | |
| 2010/0271284 A1 | 10/2010 | Pendry et al. | |
| 2010/0301971 A1 | 12/2010 | Yonak et al. | |
| 2010/0303123 A1 | 12/2010 | Li | |

FOREIGN PATENT DOCUMENTS

| | | |
|---|---|---|
| GB | 2 382 230 A | 5/2003 |
| JP | 2006-223193 | 8/2006 |
| JP | 2007-94079 A | 4/2007 |
| JP | 2006-223193 | 2/2008 |
| WO | WO 02/49146 A3 | 6/2002 |
| WO | WO 03/088419 A1 | 10/2003 |
| WO | WO 2004/093155 A3 | 10/2004 |
| WO | WO 2006/023195 A2 | 3/2006 |
| WO | WO 2008/115881 A1 | 9/2008 |
| WO | WO 2008/137509 A1 | 11/2008 |

OTHER PUBLICATIONS

Parazzoli et al.; "Performance of a negative index of refraction lens"; Applied Physics Letters; Apr. 26, 2004; pp. 3232-3234; vol. 84, No. 17; American Institute of Physics.

Tsang et al.; "Magnifying perfect lens and superlens design by coordinate transformation"; Physics Optics; Nov. 29, 2007; pp. 1-8.

Zhang et al.; "Superlenses to overcome the diffraction limit"; Nature Materials; Jun. 2008; pp. 435-441; vol. 7; Nature Publishing Group.

Alvey, Graham R. et al.; "Investigation Into Techniques for Packaging Cosite Microstrip Patch Antennas Into Handheld Devices"; Antenna Technology Small Antennas and Novel Metamaterials, 2006 IEEE International Workshop; Mar. 6-8, 2006; pp. 45-48.

Balanis, Constantine A.; *Antenna Theory: Analysis and Design*; 2005; 1136 pages; 3$^{rd}$ Edition; ISBN 047166782X; Wiley-Interscience (not provided)..

Barkovskii, L.M. et al..; "The Impedance Tensor for Electromagnetic Waves in Anisotropic Media"; Journal of Applied Spect.; 1974; pp. 836-837; 20 (6); Plenum Publishing Corporation.

Cai, Wenshan et al.; "Nonmagnetic Cloak with Minimized Scattering"; Applied Physics Letters; Published Online Sep. 11, 2007; pp. 111105-1 to 111105-3; vol. 91; American Institute of Physics.

Cai, Wenshan et al.; "Optical Cloaking with Metamaterials"; Nature Photonics; Apr. 2007; pp. 224-227; vol. 1; Nature Publishing Group.

Caloz, Christophe et al.; *"Electromagnetic Metamaterials Transmission Line Theory and Microwace Applications"*, 2006; 352 pages; ISBN 0471669857; Wiley-Interscience (not provided).

(56) References Cited

OTHER PUBLICATIONS

Chen, Hongsheng et al.; Metamaterial Exhibiting Left-Handed Properties Over Multiple Frequency Bands; Journal of Applied Physics; Nov. 1, 2004; pp. 5338-5340; vol. 96, No. 9; American Institute of Physics.

Cummer, Steven A. et al.; "Full-Wave Simulations of Electromagnetic Cloaking Structures"; Physical Review E; 2006; pp. 036621-1 to 036621-5; vol. 74; The American Physical Society.

Dewar, G.; "A Thin Wire Array and Magnetic Host Structure with n<0"; Journal of Applied Physics; pp. 10Q101-1 to 10Q101-3; vol. 97; American Institute of Physics.

Efimov, S.P.; "Compression of Electromagnetic Waves by Anisotropic Media ('Nonreflecting' Crystal Model)"; Radiophysics and Quantum Electronics; Sep. 1978; pp. 916-920; vol. 21, No. 9; Springer New York.

Engheta, Nader et al.; *Metamaterials Physics and Engineering Explorations*; 2006; 414 pages; ISBN 139780471761020; John Wiley & Sons, Inc. (not provided).

Enoch, Stefan et al.; "A Metamaterial for Directive Emission"; Physical Review Letters; Nov. 18, 2002; pp. 213902-1 to 213902-4; vol. 89, No. 21; The American Physical Society.

Georgakopoulos, Stavros V. et al.; "Cosite Interference Between Wire Antennas on Helicopter Structures and Rotor Modulation Effects: FDTD Versus Measurements"; IEEE Transactions on Electromagnetic Compatibility; Aug. 1999; pp. 221-233; vol. 41, No. 3; IEEE.

Ghose, Rabindra N.; "Collocation of Receivers and High-Power Broadcast Transmitters"; IEEE Transactions on Broadcasting; Jun. 1988; pp. 154-158; vol. 34, No. 2; IEEE.

Hoffman, Anthony J. et al.; "Negative refraction in semiconductor metamaterials"; Nature Materials; Dec. 2007; pp. 946-950; vol. 6; Nature Publishing Group.

Holden, Anthony; "Inside the Wavelength: Electromagnetics in the Near Field"; Foresight Exploiting the Electromagnetic Spectrum State of the Science Review; pp. 1-57; located at: http://www.foresight.gov.uk/Previous_Projects/Exploiting_the—electromagnetic_spectrum/Reports_and_Publications/State_of_the_science_reviews/Inside_the_wavelength/EEMS_Inside_the_wavelength.pdf.

Jacob, Zubin et al.; "Optical Hyperlens: Far-field imaging beyond the diffraction limit"; Optics Express; Sep. 4, 2006; pp. 8247-8256; vol. 14, No. 18; OSA.

Joannopoulos, John D. et al.; *"Photonic Crystals: Molding the Flow of Light (Second Edition)"*; 2008; 304 pages; ISBN-10: 0691124566; Princeton University (not provided).

Kildishev, Alexander et al.; "Engineering space for light via transformation optics"; Optics Letters; Jan. 1, 2008; pp. 43-45; vol. 33, No. 1; Optical Society of America.

Krause, John D.; Marhefka, Ronald J.; *Antennas for All Applications*; 2001; 960 pages; 3rd Edition; ISBN 0072321032; McGraw-Hill Science/Engineering/Math (not provided).

Le, Anh Q. et al.; "An Evaluation of Collocation Interference Mitigation Approach for Shipboard SINCGARS Radios"; Military Communications Conference; Nov. 7, 1995; pp. 612-616; vol. 2; IEEE.

Leonhardt, Ulf; Philbin, Thomas G.; "General Relativity in Electrical Engineering"; New Journal of Physics; 2006; pp. 1-18; vol. 8, No. 247; IOP Publishing Ltd and Deutsche Physikalische Gesellschaft.

Li, Shing Ted et al.; "EMC Analysis of a Shipboard Frequency-Hopping Communication System"; Electromagnetic Compatibility 1996, Symposium Record., IEEE 1996 International Symposium; Aug. 19-23, 1996; pp. 219-224; IEEE.

Linden, Stefan et al.; "Photonic Metamaterials: Magnetism at Optical Frequencies"; IEEE Journal of Selected Topics in Quantum Electronics; Nov./Dec. 2006; pp. 1097-1105; vol. 12, No. 6; IEEE.

Luukkonen, Olli; "Antenna Performance Enhancement Using Complex Materials"; pp. 1-8; located at: http://www.tkk.fi/Yksikot/Sahkomagnetiikka/kurssit/S-96.4620_2006/reports/antenna2.pdf.

Pendry, J.B. et al.; "Controlling Electromagnetic Fields"; Science; Jun. 23, 2006; pp. 1780-1782 (8 Total Pages including Supporting Material); vol. 312; located at: www.sciencemag.org.

Pendry, J.B.; Ramakrishna, S.A.; "Focusing Light Using Negative Refraction"; J. Phys. [Condensed Matter]; 2003; pp. 6345-6364 (pp. 1-22); vol. 15.

Pendry, J.B. et al.; "Magnetism from Conductors and Enhanced Nonlinear Phenomena"; IEEE Transactions on Microwave Theory and Techniques; Nov. 1999; pp. 2075-2084; vol. 47, No. 11; IEEE.

Rahm, Marco et al.; "Optical Design of Reflectionless Complex Media by Finite Embedded Coordinate Transformations"; Physical Review Letters; Feb. 15, 2008; pp. 063903-1-063903-4; 100, 063903 (2008); The American Physical Society.

Rahmat-Samii, Yahya; "Metamaterials in Antenna Applications: Classifications, Designs and Applications"; Antenna Technology Small Antennas and Novel Metamaterials, 2006 IEEE International Workshop; Mar. 6-8, 2006; pp. 1-4; IEEE.

Rill, Michael S. et al.; "Photonic metamaterials by direct laser writing and silver chemical vapour deposition"; Nature Materials; Advance Online Publication; May 11, 2008; pp. 1-4; Nature Publishing Group.

Sacks, Zachary S. et al.; "A Perfectly Matched Anisotropic Absorber for Use as an Absorbing Boundary Condition"; IEEE Transactions on Antennas and Propagation; Dec. 1995; pp. 1460-1463; vol. 43, No. 12; IEEE.

Salandrino, Alessandro et al.; "Far-field subdiffraction optical microscopy using metamaterial crystals: Theory and simulations"; Physical Review; Aug. 15, 2006; pp. 075103-1-075103-5; 74, 075103 (2006); The American Physical Society.

Sarychev, Andrey K. et al.; *Electrodynamics of Metamaterials*; 2007; 247 pages ISBN 139789810242459; World Scientific Publishing Co. Pte. Ltd. (not provided).

Schurig, D. et al.; "Calculation of Material Properties and Ray Tracing in Transformation Media"; Optics Express; Oct. 16, 2006; pp. 9794-9804; vol. 14, No. 21; OSA.

Schurig, D. et al.; "Metamaterial Electromagnetic Cloak at Microwave Frequencies"; Science; Nov. 10, 2006; pp. 977-980 (18 Total Pages including Supporting Material); vol. 314; located at: www.sciencemag.org.

Schurig, D. et al.; "Transformation-designed optical elements"; Optics Express; Oct. 29, 2007; pp. 14772-14782; vol. 15, No. 22; OSA.

Shalaev, Vladimir M.; "Optical Negative-Index Metamaterials"; Nature Photonics; Jan. 2007; pp. 41-48; vol. 1; Nature Publishing Group.

Sievenpiper, Dan et al.; "High-Impedance Electromagnetic Surfaces with a Forbidden Frequency Band"; IEEE Transactions on Microwave Theory and Techniques; Nov. 1999; pp. 2059-2074; vol. 47, No. 11; IEEE.

Smith, D.R.; Schurig, D.; "Electromagnetic Wave Propagation in Media with Indefinite Permittivity and Permeability Tensors"; Physical Review Letters; Feb. 21, 2003; pp. 077405-1 to 077405-4; vol. 90, No. 7; The American Physical Society.

Smith, D.R. et al.; "Metamaterials and Negative Refractive Index"; Science; Aug. 6, 2004; pp. 788-792; vol. 305; located at: www.sciencemag.org.

Sohn, J.R. et al.; "Comparative Study on Various Artificial Magnetic Conductors for Low-Profile Antenna"; Progress in Electromagnetics Research; 2006; pp. 27-37; vol. 61; located at: http://ceta.mit.edu/PIER/pier61/02.0601171.SK.Tae.L.pdf.

Travis, G.W.; Lenzing, H.F.; "Shipboard HF Interference: Problems and Mitigation"; Military Communications Conference 1989, MILCOM '89, Conference Record. 'Bridging the Gap Interoperability, Survivability, Security'; Oct. 15-18, 1989; pp. 106-110; vol. 1; IEEE.

Venskauskas, Kostas et al.; "Interference Cancellation Systems for Electromagnetically Dense Platforms"; Antennas and Propagation Society International Symposium, 1999; Aug. 1999; pp. 1612-1615; vol. 3; IEEE.

Ward, A.J.; Pendry, J.B.; "Refraction and Geometry in Maxwell's Equations"; Journal of Modern Optics; 1996; pp. 773-793; vol. 43.

Yang, Fan; Rahmat-Samii, Yahya; "Microstrip Antennas Integrated with Electromagnetic Band-Gap (EBG) Structures: A Low Mutual Coupling Design for Array Applications"; IEEE Transactions on Antennas and Propagation; Oct. 2003; pp. 2936-2946; vol. 51, No. 10; IEEE.

(56) References Cited

OTHER PUBLICATIONS

Yang, Fan; Rahmat-Samii, Yahya; "Reflection Phase Characterizations of the EBG Ground Plane for Low Profile Wire Antenna Applications"; IEEE Transactions on Antennas and Propagation; Oct. 2003; pp. 2691-2703; vol. 51, No. 10; IEEE.
Zharov, Alexander A. et al.; "Birefringent Left-Handed Metamaterials and Perfect Lénses for Vectorial Fields"; New Journal of Physics; 2005; pp. 1-9; vol. 7; IOP Publishing Ltd. and Deutsche Physikalische Gesellschaft.
U.S. Appl. No. 11/982,353, John Brian Pendry et al.
U.S. Appl. No. 12/069,170, John Brian Pendry et al.
U.S. Appl. No. 12/074,247, Jordin T. Kare.
U.S. Appl. No. 12/074,248, Jordin T. Kare.
U.S. Appl. No. 12/156,443, Jeffrey A. Bowers et al.
U.S. Appl. No. 12/214,534, Jeffrey A. Bowers et al.
U.S. Appl. No. 12/220,705, Jeffrey A. Bowers et al.
U.S. Appl. No. 12/220,703, Jeffrey A. Bowers et al.
U.S. Appl. No. 12/221,198, Jeffrey A. Bowers et al.
U.S. Appl. No. 12/228,140, Jeffrey A. Bowers et al.
U.S. Appl. No. 12/228,153, Jeffrey A. Bowers et al.
U.S. Appl. No. 12/231,681, Jeffrey A. Bowers et al.
U.S. Appl. No. 12/283,352, Jeffrey A. Bowers et al.
Kshertrimayum, R.S.; "A brief intro to metamaterials"; IEEE Potentials; bearing a date of Dec. 2004-Jan. 2005; vol. 23, Issue 5; pp. 44-46; IEEE.
Kwon, Do-Hoon, Werner, Douglas H.; "Restoration of antenna parameters in scattering environments using electromagnetic cloaking"; Applied Physics Letters 92; bearing a date of 2008; pp. 1-3; American Institute of Physics.
Pendry, John; "Metamaterials open new horizons in electromagnetism"; publication date unknown; Imperial College London; located at www.ecti.utoronto.ca/Assets/Events/PendryDispEng.pdf.
Vardaxoglou et al.; "Recent advances on Metamaterials with applications in terminal and high gain array and reflector antennas"; bearing a date of 2006; IEEE; pp. 423-426.
UK Intellectual Property Office; Patent Act 1977: Search Report under Sections 17; App. No. GB0819691.7; bearing a date of Jan. 16, 2009; p. 1.
Eleftheriades, George V., et al.; Planar Negative Refractive Index Media Using Periodically L-C Loaded Transmission Lines; IEEE Transactions on Microwave Theory and Techniques; bearing a date of Dec. 12, 2002; pp. 2702-2712; vol. 50, No. 12; © 2002 IEEE.
Freire, M.J., et al.; "Three dimensional sub-diffraction imaging by a planar metamaterial lens"; Microwave Conference, 2005 European; bearing a date of Oct. 4-6, 2005; pp. 1-4; vol. 2; located at http://ieeexplore.ieee.orgisearch/wrapper.jsp?arnumber=1610024.
Hwang, Jiunn-Nan et al.; "Reduction of the Peak SAR in the Human Head With Metamaterials"; IEEE Transactions on Antennas and Propagation; bearing a date of Dec. 2006; pp. 3763-3770; vol. 54, No. 12; © 2006 IEEE.
Intellectual Property Office Search Report Under Section 17(6); App. No. GB0819691.7; Jun. 22, 2009; pp. 1-2 [1 of 4].
Intellectual Property Office Search Report Under Section 17(6); App. No. GB0819691.7; Jun. 22, 2009; pp. 1-2 [2 of 4].
Intellectual Property Office Search Report Under Section 17(6); App. No. GB0819691.7; Jun. 22, 2009; pp. 1-2 [3 of 4].
Intellectual Property Office Search Report Under Section 17(6); App. No. GB0819691.7; Jun. 22, 2009; pp. 1-2 [4 of 4].
Landy, N. I., et al.; "A Perfect Metamaterial Absorber"; arXiv:0803,1670v1[cond-mat.mes-hall]; bearing a date of Mar. 11, 2008; pp. 1-6; located at http://arxiv.org/PS_cache/arxiv/pdf/0803/0803.1670v1.pdf.
PCT International Search Report; International App. No. PCT/US 09/03292; bearing a date of Aug. 6, 2009; pp. 1-3.
Pendry, J.B.; "Manipulating the Near Field with Metamaterials"; Optics & Photonics News; bearing a date of Sep. 2004; pp. 1-6.
Smith, D. R., et al.; "Gradient index metamaterials"; Physical Review E 71, 036609; bearing a date of 2005; pp. 1-6; © 2005 The American Physical Society.

Urban, Jeffrey J., et al.; "Synergism in binary nanocrystal superlattices leads to enhanced p-type conductivity in self-assembled PbTe/$Ag_2$Te thin films"; Nature Materials; bearing a date of Feb. 2007; pp. 115-121; vol. 6; © 2007 Nature Publishing Group.
Wiltshire, M.C.K., et al.; "Metamaterial endoscope for magnetic field transfer: near field imaging with magnetic wires"; Optics Express; bearing a date of Apr. 7, 2003; pp. 709-715; vol. 11, No. 7; © 2003 OSA.
Xu, Z. X., et al.; "Controllable Absorbing Structure of Metamaterial At Microwave"; Progress in Electromagnetics Research, PIER; bearing a date of 2007; pp. 117-125; vol. 69.
PCT International Search Report; International App. No. PCT/US 09/03272; pp. 1-4; Sep. 21, 2009.
Sears, Francis Weston; "Refraction of a Spherical Wave at a Plane Surface"; "Optics"; bearing a $5^{th}$ printing date of Apr. 1958; pp. 38-43; Addison-Wesley Publishing Company; Reading, MA.
Wang, et al.; "Nanopin Plasmonic Resonator Array and Its Optical Properties"; Nano Letters; bearing a date of 2007; pp. 1076-1080; vol. 7, No. 4; American Chemical Society.
Padilla, Willie J. et al; "Negative refractive index metamaterials"; materialstoday; Jul.-Aug. 2006; pp. 28-35; vol. 9; No. 7-8; Elsevier Ltd.
*Ariad* v. *Eli Lilly*; United States Court of Appeals for the Federal Circuit; Case No. 2008-1248; bearing a date of 2010; total of 72 pages; located at http://www.cafc.uscourts.gov/opinions/08-1248.pdf.
Cowan, Ben; "FDTD modeling of photonic crystal fibers"; EE256 Final Project; pp. 1-7.
Driscoll, T. et al.; "Free-space microwave focusing by a negative-index gradient lens"; Applied Physics Letters; bearing a published online date of Feb. 21, 2006; printed on May 14, 2010; pp. 1-4; vol. 88, Issue 8; © 2006 American Institute of Physics.
Grzegorczyk, Tomasz M. et al.; "Refraction Laws for Anisotropic Media and Their Application to Left-Handed Metamaterials"; IEEE Transactions on Microwave Theory and Techniques; bearing a date of Apr. 2005; pp. 1443-1450; vol. 55, No. 4; © 2005 IEEE.
Padilla, Willie J. et al.; "Negative refractive index metamaterials"; Materials Today; bearing a date of Jul.-Aug. 2006; pp. 28-35; vol. 9, No. 7-8; © Elsevier Ltd. 2006.
PCT International Search Report; International App. No. PCT/US 09/01108; Nov. 16, 2009; pp. 1-2.
Satoh, Hiroaki et al.; "Studies on Functional Photonic Crystal Devices Utilizing Anisotropic Medium Properties by Condensed Node Spatial Network Method"; International Symposium on Communications and Information Technologies 2004 (ISCIT 2004); bearing a date of Oct. 26-29, 2004; pp. 829-834.
Yannopapas, Vassilios et al.; "Negative refractive index metamaterials from inherently non-magnetic materials for deep infrared to terahertz frequency ranges"; Journal of Physics: Condensed Matter; bearing a date of 2005; pp. 3717-3734; vol. 17; Institute of Physics Publishing.
European Patent Office Supplementary European Search Report; App. No. EP 09 75 8642; Feb. 28, 2011; pp. 1-5.
Alù, Andrea et al.; "Achieving transparency with plasmonic and metamaterial coatings", Physical Review E; bearing a date of 2005; pp. 1-23; vol. 742, No. 016623; American Physical Society.
"Double Refraction and Birefringence"; CMDITRWIKI; bearing a date of Sep. 2, 2009; pp. 1-5; located at http://depts.washington.edu/cmditr/mediawiki/index.php?title+Double_Refraction_and_Birefringence.
Halim, Suria Binti; "Antenna With Metamaterial Design"; Universiti Teknologi Malaysia; bearing a date of May 2007; 88 pages; Universiti Teknologi Malaysia.
Kirchhoff, Herb; "What Are the Physical Properties of Sapphires?"; ehow.com;.bearing a date of Aug. 23, 2010; pp. 1-2; located at http://www.ehow.com/print/list_6863886_physical-properties-sapphires_.html.
Pendry, J. B. et al.; "Extremely Low Frequency Plasmons in Metallic Mesostructures"; Physical Review Letters; bearing a date of Jun. 17, 1996; pp. 4773-4776; vol. 76, No. 25; The American Physical Society.

(56) References Cited

OTHER PUBLICATIONS

Pendry, John B. et al.; "Reversing Light With Negative Refraction"; Physics Today; bearing a date of Jun. 2004; pp. 37-43; American Institute of Physics.

Sears, Francis Weston; *Optics*; bearing a date of 1949; 386 pages; 3rd Edition; ISBN-10: 0201069156; ISBN-13: 978-0201069150; Addison Wesley Publishing Company (not provided).

Stickel, Micah et al.; "Volumetric negative-refractive-index metamaterials based upon the shunt-node transmission-line configuration"; Journal of Applied Physics; bearing a date of 2007; pp. 094903-1-094903-7; vol. 102; American Institute of Physics.

Chinese Office Action; App. No. 200980110212.2; bearing a date of Sep. 27, 2011; pp. 1-3; no translation provided.

Holden, Anthony; "Inside the Wavelength: Electromagnetics in the Near Field"; Jan. 30, 2004; Foresight Exploiting the Electromagnetic Spectrum State of the Science Review; pp. 1-57; located at: http://www.foresight.gov.uk/Previous_Projects/Exploiting_the_electromagnetic_spectrum/Reports_and_Publications/State_of_the_science_reviews/Inside_the_wavelength/EEMS_Inside_the_wavelength.pdf.

Pendry, John; "Metamaterials open new horizons in electromagnetism"; Jun. 26, 2008; Imperial College London; located at www.ecti.utoronto.ca/Assets/Events/PendryDispEng.pdf.

UK Intellectual Property Office Examination Report Under Section 18(3); App. No. GB0819691.7; Jun. 25, 2010; pp. 1-3.

* cited by examiner

FOCUSING AND SENSING APPARATUS, METHODS, AND SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/156,443, entitled FOCUSING AND SENSING APPARATUS, METHODS, AND SYSTEMS, naming Jeffrey A. Bowers, Roderick A. Hyde, Edward K. Y. Jung, John Brian Pendry, David Schurig, David R. Smith, Clarence T. Tegreene, Thomas A. Weaver, Charles Whitmer, and Lowell L. Wood, Jr. as inventors, filed May 30, 2008, now U.S. Pat. No. 8,493,669 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/221,201, entitled FOCUSING AND SENSING APPARATUS, METHODS, AND SYSTEMS, naming Jeffrey A. Bowers, Roderick A. Hyde, Edward K. Y. Jung, John Brian Pendry, David Schurig, David R. Smith, Clarence T. Tegreene, Thomas A. Weaver, Charles Whitmer, and Lowell L. Wood, Jr. as inventors, filed Jul. 30, 2008, now U.S. Pat. No. 7,710,664 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The application discloses apparatus, methods, and systems that may relate to electromagnetic responses that include focusing, focus-adjusting, and sensing.

DETAILED DESCRIPTION

Figure 1:
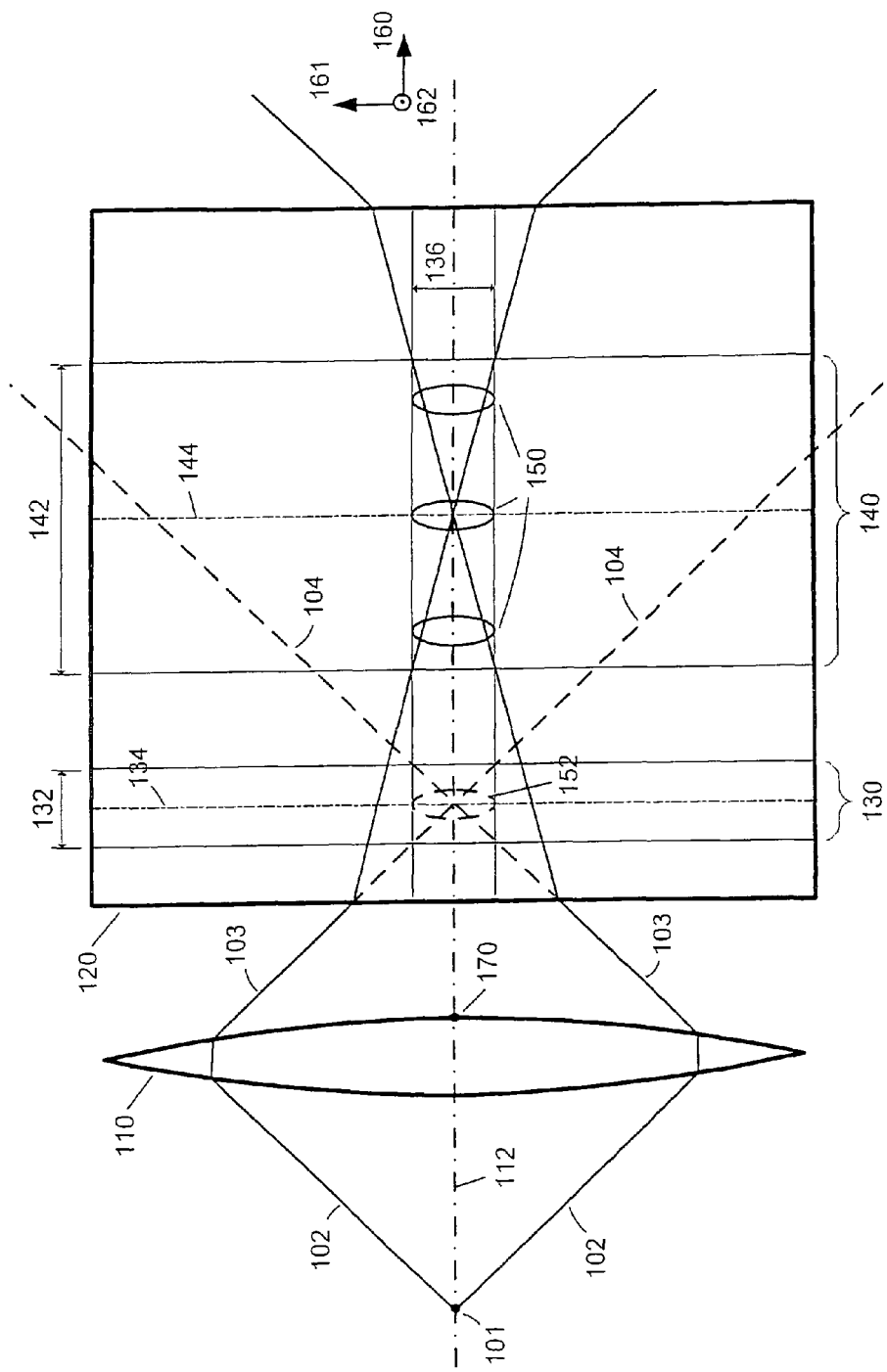
FIG. 1 depicts a first configuration of a focusing structure and a focus-adjusting structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Transformation optics is an emerging field of electromagnetic engineering. Transformation optics devices include lenses that refract electromagnetic waves, where the refraction imitates the bending of light in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths.

A first exemplary transformation optics device is the electromagnetic cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electric permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, D. Schurig, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transform optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

Additional exemplary transformation optics devices are described in D. Schurig; et al, "Transformation-designed optical elements," Opt. Exp. 15, 14772 (2007); M. Rahm et al, "Optical design of reflectionless complex media by finite embedded coordinate transformations," Phys. Rev. Lett. 100, 063903 (2008); and A. Kildishev and V. Shalaev, "Engineering space for light via transformation optics," Opt. Lett. 33, 43 (2008); each of which is herein incorporated by reference.

In general, for a selected coordinate transformation, a transformation medium can be identified wherein electromagnetic waves refract as if propagating in a curved coordinate space corresponding to the selected coordinate transformation. Constitutive parameters of the transformation medium can be obtained from the equations:

$$\tilde{\in}^{i'j'} = |det(\Lambda)|^{-1} \Lambda_i^{i'} \Lambda_j^{j'} \in^{ij} \quad (1)$$

$$\tilde{\mu}^{i'j'} = |det(\Lambda)|^{-1} \Lambda_i^{i'} \Lambda_j^{j'} \mu^{ij} \quad (2)$$

where $\tilde{\in}$ and $\tilde{\mu}$ are the permittivity and permeability tensors of the transformation medium, $\in$ and $\mu$ are the permittivity and permeability tensors of the original medium in the untransformed coordinate space, and $$\Lambda_i^{i'} = \frac{\partial x^{i'}}{\partial x^i} \quad (3)$$

is the Jacobian matrix corresponding to the coordinate transformation. In some applications, the coordinate transformation is a one-to-one mapping of locations in the untransformed coordinate space to locations in the transformed coordinate space, and in other applications the coordinate transformation is a many-to-one mapping of locations in the untransformed coordinate space to locations in the transformed coordinate space. Some coordinate transformations, such as many-to-one mappings, may correspond to a transformation medium having a negative index of refraction. In some applications, only selected matrix elements of the permittivity and permeability tensors need satisfy equations (1) and (2), e.g. where the transformation optics response is for a selected polarization only. In other applications, a first set of permittivity and permeability matrix elements satisfy equations (1) and (2) with a first Jacobian $\Lambda$, corresponding to a first transformation optics response for a first polarization of electromagnetic waves, and a second set of permittivity and permeability matrix elements, orthogonal (or otherwise complementary) to the first set of matrix elements, satisfy equations (1) and (2) with a second Jacobian $\Lambda'$, corresponding to a second transformation optics response for a second polarization of electromagnetic waves. In yet other applications, reduced parameters are used that may not satisfy equations (1) and (2), but preserve products of selected elements in (1) and selected elements in (2), thus preserving dispersion relations inside the transformation medium (see, for example, D. Schurig et al (2), supra, and W. Cai et al, "Optical cloaking with metamaterials," Nature Photonics 1, 224 (2007), herein incorporated by reference). Reduced parameters can be used, for example, to substitute a magnetic response for an electric response, or vice versa. While reduced parameters preserve dispersion relations inside the transformation medium (so that the ray or wave trajectories inside the transformation medium are unchanged from those of equations (1) and (2)), they may not preserve impedance characteristics of the transformation medium, so that rays or waves incident upon a boundary or interface of the transformation medium may sustain reflections (whereas in general a transformation medium according to equations (1) and (2) is substantially nonreflective). The reflective or scattering characteristics of a transformation medium with reduced parameters can be substantially reduced or eliminated by a suitable choice of coordinate transformation, e.g. by selecting a coordinate transformation for which the corresponding Jacobian $\Lambda$ (or a subset of elements thereof) is continuous or substantially continuous at a boundary or interface of the transformation medium (see, for example, W. Cai et al, "Nonmagnetic cloak with minimized scattering," Appl. Phys. Lett. 91, 111105 (2007), herein incorporated by reference).

In general, constitutive parameters (such as permittivity and permeability) of a medium responsive to an electromagnetic wave can vary with respect to a frequency of the electromagnetic wave (or equivalently, with respect to a wavelength of the electromagnetic wave in vacuum or in a reference medium). Thus, a medium can have constitutive parameters $\in_1$, $\mu_1$, etc. at a first frequency, and constitutive parameters $\in_2$, $\mu_2$, etc. at a second frequency; and so on for a plurality of constitutive parameters at a plurality of frequencies. In the context of a transformation medium, constitutive parameters at a first frequency can provide a first response to electromagnetic waves at the first frequency, corresponding to a first selected coordinate transformation, and constitutive parameters at a second frequency can provide a second response to electromagnetic waves at the second frequency, corresponding to a second selected coordinate transformation; and so on: a plurality of constitutive parameters at a plurality of frequencies can provide a plurality of responses to electromagnetic waves corresponding to a plurality of coordinate transformations. In some embodiments the first response at the first frequency is substantially nonzero (i.e. one or both of $\in_1$ and $\mu_1$ is substantially non-unity), corresponding to a nontrivial coordinate transformation, and a second response at a second frequency is substantially zero (i.e. $\in_2$ and $\mu_2$ are substantially unity), corresponding to a trivial coordinate transformation (i.e. a coordinate transformation that leaves the coordinates unchanged); thus, electromagnetic waves at the first frequency are refracted (substantially according to the nontrivial coordinate transformation), and electromagnetic waves at the second frequency are substantially nonrefracted. Constitutive parameters of a medium can also change with time (e.g. in response to an external input or control signal), so that the response to an electromagnetic wave can vary with respect to frequency and/or time. Some embodiments may exploit this variation with frequency and/or time to provide respective frequency and/or time multiplexing/demultiplexing of electromagnetic waves. Thus, for example, a transformation medium can have a first response at a frequency at time $t_1$, corresponding to a first selected coordinate transformation, and a second response at the same frequency at time $t_2$, corresponding to a second selected coordinate transformation. As another example, a transformation medium can have a response at a first frequency at time $t_1$, corresponding to a selected coordinate transformation, and substantially the same response at a second frequency at time $t_2$. In yet another example, a transformation medium can have, at time $t_1$, a first response at a first frequency and a second response at a second frequency, whereas at time $t_2$, the responses are switched, i.e. the second response (or a substantial equivalent thereof) is at the first frequency and the first response (or a substantial equivalent thereof) is at the second frequency. The second response can be a zero or substantially zero response. Other embodiments that utilize frequency and/or time dependence of the transformation medium will be apparent to one of skill in the art.

Constitutive parameters such as those of equations (1) and (2) (or reduced parameters derived therefrom) can be realized using artificially-structured materials. Generally speaking, the electromagnetic properties of artificially-structured materials derive from their structural configurations, rather than or in addition to their material composition.

In some embodiments, the artificially-structured materials are photonic crystals. Some exemplary photonic crystals are described in J. D. Joannopoulos et al, *Photonic Crystals Molding the Flow of Light*, 2$^{nd}$ Edition, Princeton Univ. Press, 2008, herein incorporated by reference. In a photonic crystals, photonic dispersion relations and/or photonic band gaps are engineered by imposing a spatially-varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al, "Variable metamaterial apparatus," U.S. patent application Ser. No. 11/355,493; D. Smith et al, "Metamaterials," International Application No. PCT/US2005/026052; D. Smith et al, "Metamaterials and negative refractive index," Science 305, 788 (2004); D. Smith et al, "Indefinite materials," U.S. patent application Ser. No. 10/525,191; C. Caloz and T. Itoh, *Electromagnetic Metamaterials: Transmission Line Theory and Microwave Applications*, Wiley-Interscience, 2006; N. Engheta and R. W. Ziolkowski, eds., *Metamaterials: Physics and Engineering Explorations*, Wiley-Interscience, 2006; and A. K. Sarychev and V. M. Shalaev, *Electrodynamics of Metamaterials*, World Scientific, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075. (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

With reference now to FIG. 1, an illustrative embodiment is depicted that includes a focusing structure 110 and a focus-adjusting structure 120. This and other drawings, unless context dictates otherwise, can represent a planar view of a three-dimensional embodiment, or a two-dimensional embodiment (e.g. in FIG. 1 where the transducers are positioned inside a metallic or dielectric slab waveguide oriented normal to the page). The focusing structure receives input electromagnetic energy, depicted as solid rays 102; in this example, the input electromagnetic energy radiates from an electromagnetic source 101 positioned on an optical axis 112 of the focusing structure (the use of a ray description, in FIG. 1 and elsewhere, is a heuristic convenience for purposes of visual illustration, and is not intended to connote any limitations or assumptions of geometrical optics; further, the elements depicted in FIG. 1 can have spatial dimensions that are variously less than, greater than, or comparable to a wavelength of interest). The solid rays 103 represent output electromagnetic energy from the focusing structure. This output electromagnetic energy is received by the focus-adjusting structure 120, which influences the propagation of the output electromagnetic energy (e.g. by refracting the rays 103, as depicted). The dashed rays 104 represent the "nominal" propagation of the output electromagnetic energy, i.e. the propagation that would occur in the absence of the focus-adjusting structure. As the dashed rays indicate, the focusing structure 110 provides a nominal focusing region 130 having a nominal depth of focus 132; in this example, the nominal focusing region 130 is depicted as a slab having a thickness equal to the nominal depth of focus 132 and centered on a nominal focal plane 134 (where the dashed rays converge). The focus-adjusting structure 120 influences the propagation of the output electromagnetic energy to provide an actual focusing region 140 different than the nominal focusing region 130, the actual focusing region having an actual depth of focus 142 which is an extended depth of focus greater than the nominal depth of focus; in this example, the actual focusing region 140 is depicted as a slab having a thickness equal to the actual depth of focus 142 and centered on an actual focal plane 144. Embodiments optionally include one or more electromagnetic sensors (schematically depicted as ellipses 150) positioned within the actual focusing region. The dashed ellipse 152 represents a nominal sensor positioning, i.e. a sensor positioning within the nominal focusing region 130 that could apply in the absence of the focus-adjusting structure (in the present example, sensors are positioned only along the optical axis 112 of the focusing structure, but this is not intended to be limiting). As the figure demonstrates, the actual depth of focus may, in some embodiments, accommodate more sensors than the nominal depth of focus.

The focusing structure 110 is depicted in FIG. 1 as having a lens-like shape, but this is a schematic illustration and is not intended to be limiting. In various embodiments, focusing structures can include reflective structures (e.g. parabolic dish reflectors), refractive structures (e.g. dielectric, microwave, gradient index, or metamaterial lenses), diffractive structures (e.g. Fresnel zone plates), antenna structures (e.g. antenna director elements, antenna arrays), waveguiding structures (e.g. waveguides, transmission lines, and coherent bundles thereof) and various combinations, assemblies, portions, and hybrids thereof (such as an optical assembly or a refractive-diffractive lens). In general, a focusing structure provides a nominal focusing region wherein electromagnetic energy coupled to the focusing structure is nominally substantially concentrated (i.e. wherein electromagnetic energy coupled to the focusing structure is substantially concentrated in the absence of a focus-adjusting structure; the influence of the focus-adjusting structure is discussed below). In some embodiments, the nominal focusing region may be a planar or substantially planar slab (e.g. 130 in FIG. 1) having a thickness corresponding to a nominal depth of focus of the focusing structure (e.g. 132 in FIG. 1) and centered on a nominal focal plane (e.g. 134 in FIG. 1). In other embodiments, the nominal focusing region may be a non-planar region, e.g. a cylindrically-, spherically-, ellipsoidally-, or otherwise-curved slab having a thickness corresponding to a nominal depth of focus of the focusing structure, and the non-planar region may enclose a non-planar focal surface (such as a Petzval, sagittal, or transverse focal surface). In some embodiments the focusing structure defines an optical axis (such as that depicted as element 112 in FIG. 1) as a symmetry or central axis of the focusing structure, and the optical axis provides an axial direction (such as the axial unit vector 160 in FIG. 1), with transverse directions defined perpendicular thereto (such as the transverse unit vectors 161 and 162 in FIG. 1). More generally, one may define an axial direction corresponding to the nominal depth of focus (with transverse directions perpendicular thereto), so that the nominal depth of focus is equivalent to a nominal axial dimension of the nominal focusing region. This is consistent with FIG. 1, where the nominal focusing region is a planar slab, and the axial direction corresponds to a unit vector normal to the slab. Where the nominal focusing region is curved, the axial direction can vary along the transverse extent of the focusing region. For example, where the nominal focusing region is a cylindrically- or spherically-curved slab, the axial direction corresponds to a radius unit vector (and the transverse directions correspond to height/azimuth unit vectors or azimuth/zenith unit vectors, respectively); where the nominal focusing region is an otherwise-curved slab, the axial direction corresponds to a vector locally normal to the slab surface (and the transverse directions correspond to orthogonal unit vectors locally tangent to the slab surface).

In some embodiments the nominal depth of focus of a focusing structure may be related to an f-number f/# of the focusing structure, and/or to a resolution length l in a transverse direction of the nominal focusing region. The f-number can correspond to a ratio of focal length to aperture diameter for the focusing structure, and may (inversely) characterize the convergence of electromagnetic energy towards the nominal focusing region; moreover, the convergence can correspond to a ratio of nominal depth of focus to transverse resolution length; so the following general relation may apply for the focusing structure:

$$f/\# \sim \frac{d_N}{l} \quad (4)$$

where $d_N$ is the nominal depth of focus. Thus, for a fixed f-number, a larger (smaller) nominal depth of focus corresponds to a larger (smaller) resolution length. This is demonstrated, for example, in FIG. 1, which indicates a resolution length 136 corresponding to a transverse extent of the nominal rays 104 at the surface of the nominal focusing region 130. In some embodiments the resolution length may corresponds to a circle of confusion (CoC) diameter limit for image blur perception, and/or the resolution length may correspond to a transverse extent of (the sensitive area of) an individual sensor or multiplet of sensors, as further discussed below.

In the context of a focus-adjusting structure (e.g. 120 in FIG. 1), one may further define (in addition to a nominal focusing region discussed above) an actual focusing region as a region wherein electromagnetic energy coupled to the focusing structure is substantially concentrated in the presence of the focus-adjusting structure. In some embodiments, the actual focusing region may be a planar or substantially planar slab (e.g. 140 in FIG. 1) having a thickness corresponding to an actual depth of focus of the focusing structure (e.g. 142 in FIG. 1) and centered on an actual focal plane (e.g. 144 in FIG. 1). In other embodiments, the actual focusing region may be a non-planar region, e.g. a cylindrically-, spherically-, ellipsoidally-, or otherwise-curved slab having a thickness corresponding to an actual depth of focus of the focusing structure, and the non-planar region may enclose a non-planar focal surface (such as a Petzval, sagittal, or transverse focal surface). In embodiments where the nominal focusing region and the actual focusing region are substantially parallel (for substantially planar slabs), substantially concentric/confocal (for substantially cylindrically-, spherically, or ellipsoidally-curved slabs), or otherwise substantially co-curved, the axial and transverse directions (defined previously for the nominal focusing region) also apply to the geometry of the actual focusing region; i.e. the axial direction corresponds to both the nominal and axial depths of focus (with transverse directions perpendicular thereto), and the actual depth of focus is equivalent to a actual axial dimension of the actual focusing region as measured along the axial dimension defined previously.

Figure 2:
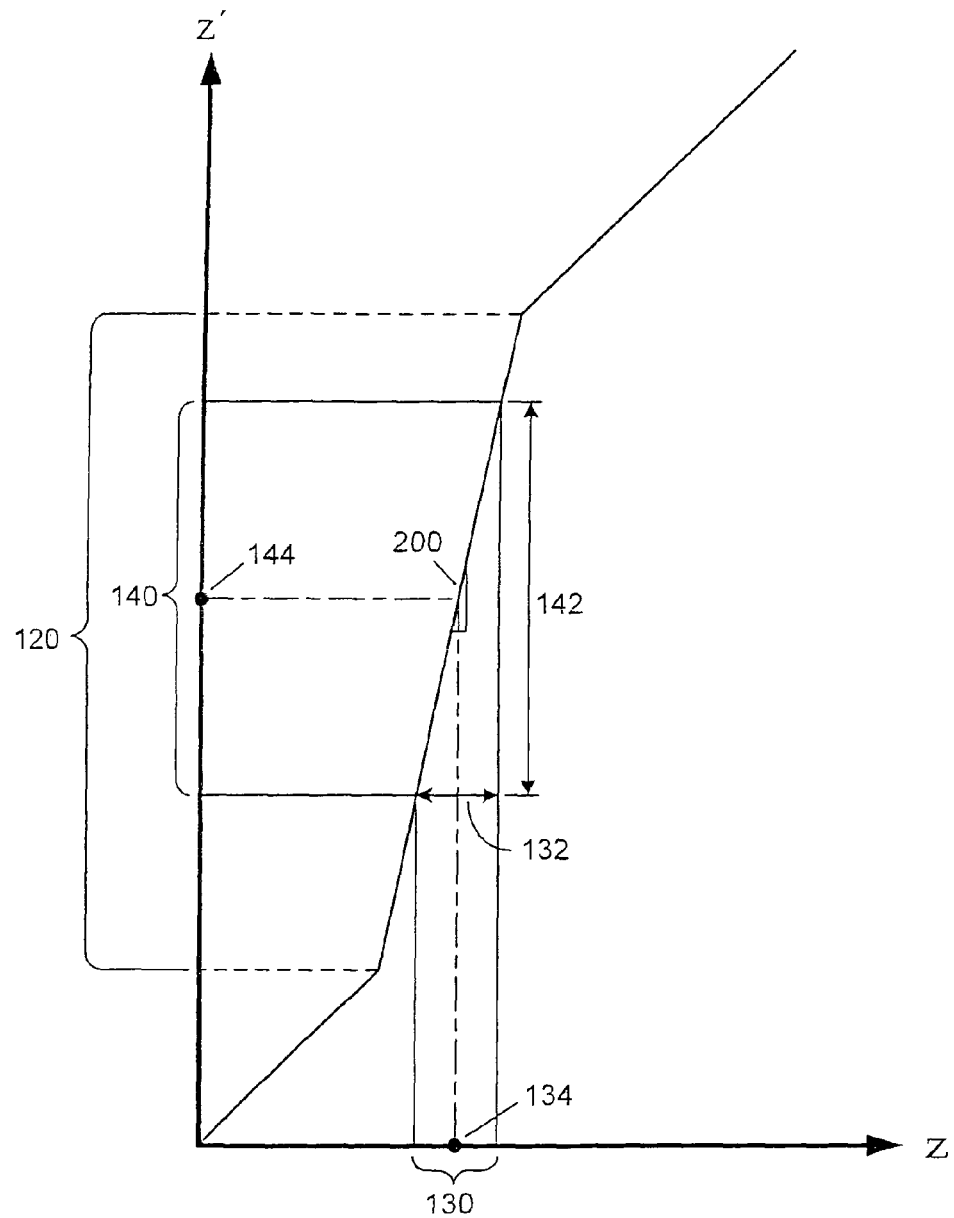
FIG. 2 depicts a first coordinate transformation.

In some embodiments a focus-adjusting structure, such as that depicted in FIG. 1, includes a transformation medium. For example, the ray trajectories 103 in FIG. 1 correspond to a coordinate transformation that is a uniform spatial dilation along the axial direction 160 (within the axial extent of the focus-adjusting structure 120); this coordinate transformation can be used to identify constitutive parameters for a corresponding transformation medium (e.g. as provided in equations (1) and (2), or reduced parameters obtained therefrom) that responds to electromagnetic radiation as in FIG. 1. Explicitly, for the example of FIG. 1, defining z as an untransformed (nominal) focal distance and z' as a transformed (actual) focal distance (where the distances are measured from the rear vertex 170 along the axial direction 160), the coordinate transformation z'=f(z) is depicted in FIG. 2. The nominal focusing region 130 and the z-position of the nominal focal plane 134 are indicated on the z-axis; the actual focusing region 140; the z'-position of the actual focal plane 144, and the axial extent of the focus-adjusting structure are indicated on the z'-axis. Defining a scale factor $$s = \frac{dz'}{dz} = f'(z), \quad (5)$$

the example of FIGS. 1-2 presents a constant scale factor s>1 within the focus-adjusting structure 120, corresponding to a uniform spatial dilation. Supposing that the focus-adjusting structure is surrounded by an ambient isotropic medium with constitutive parameters $\epsilon^{ij}=\epsilon\delta^{ij}$, $\mu^{ij}=\mu\delta^{ij}$, the constitutive parameters of the transformation medium are obtained from equations (1) and (2) and are given by (in a basis with unit vectors 161, 162, and 160, respectively, in FIG. 1)

$$\tilde{\epsilon} = \begin{pmatrix} s^{-1} & 0 & 0 \\ 0 & s^{-1} & 0 \\ 0 & 0 & s \end{pmatrix}\epsilon, \quad \tilde{\mu} = \begin{pmatrix} s^{-1} & 0 & 0 \\ 0 & s^{-1} & 0 \\ 0 & 0 & s \end{pmatrix}\mu. \quad (6)$$

Thus, the uniform spatial dilation of FIGS. 1-2 corresponds to a transformation medium that is a uniform uniaxial medium.

Figure 3:
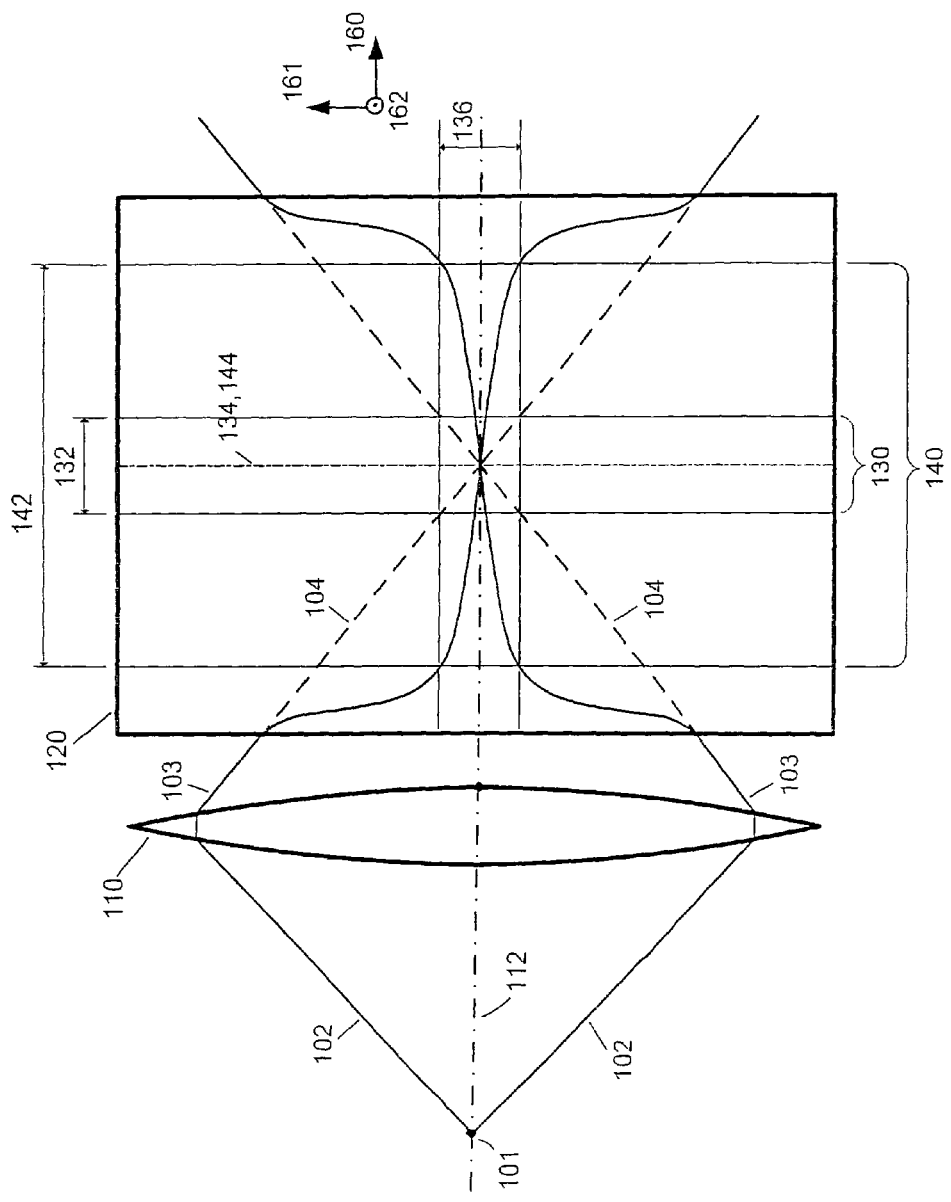
FIG. 3 depicts a second configuration of a focusing structure and a focus-adjusting structure.
Figure 4:
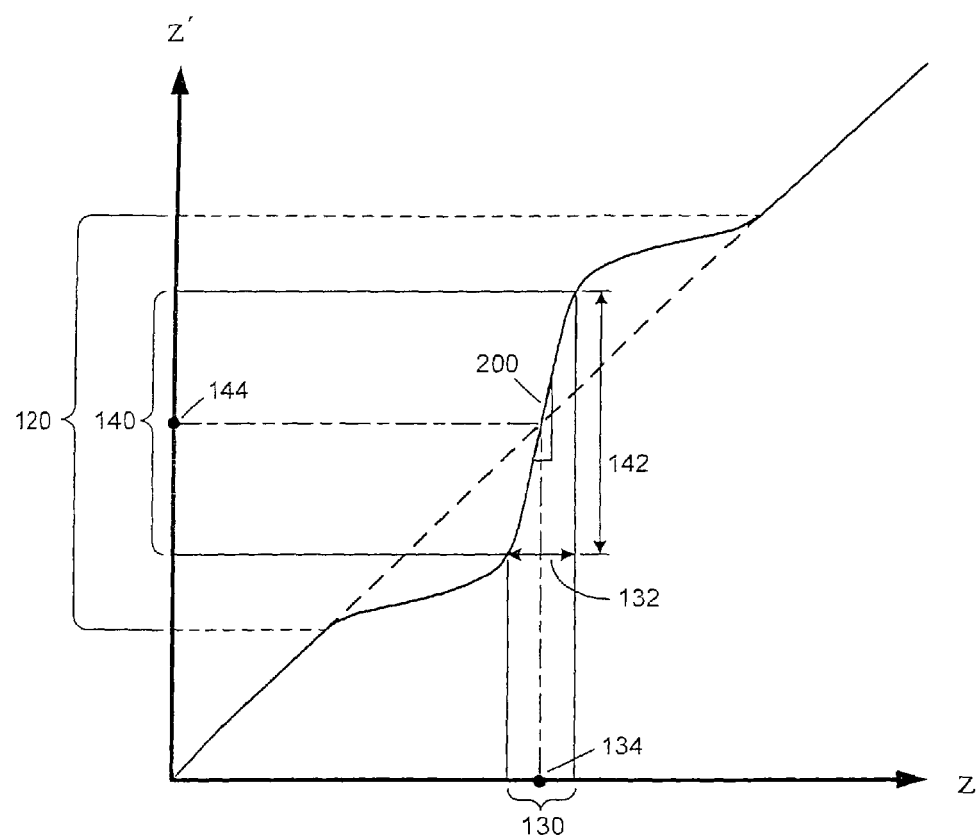
FIG. 4 depicts a second coordinate transformation.

In some embodiments, the focus-adjusting structure includes a transformation medium that provides a non-uniform spatial dilation. An example is depicted in FIG. 3 and the corresponding coordinate transformation z'=f(z) is depicted in FIG. 4. In FIG. 3, as in FIG. 1, a focusing structure 110 provides a nominal focusing region 130 having a nominal depth of field 132, and the focus-adjusting structure 120 provides an actual focusing region 140 having an actual depth of field 742, where the actual depth of field is an extended depth of field greater than the nominal depth of field. In contrast to FIG. 1, however, the embodiment of FIG. 3 provides an actual focal plane 144 coincident with the nominal focal plane 134; moreover, after exiting the focus-adjusting structure, the actual rays 103 and the nominal rays 104 propagate identically (implying that an optical path length through the focus-adjusting structure is equal to a nominal optical path length where the focus-adjusting structure is replaced by an ambient medium). These attributes are demonstrated in FIG. 4, where the dashed line z'=z intersects z'=f(z) at the position of the focal plane, and at the endpoints of the focus-adjusting structure. The example of FIGS. 3-4 presents a non-uniform scale factor s (the slope of the mapping function z'=f(z)); indeed, the scale factor in this example is variously less than unity (corresponding to a local spatial compression) and greater than unity (corresponding to a local spatial dilation). The constitutive relations are again given by equations (6), where s is variable in the axial direction, and the transformation medium is a non-uniform uniaxial medium.

More generally, embodiments of a focus-adjusting structure, operable to provide an extended depth of focus for output electromagnetic energy greater than the nominal depth of focus, may comprise a transformation medium, the transformation medium corresponding to a coordinate transformation that maps a nominal focusing region (with a nominal depth of focus) to an actual focusing region (with an actual depth of focus greater than the nominal depth of focus); and the constitutive relations of this transformation medium may be implemented with an artificially-structured material (such as a metamaterial), as described previously. In some embodiments, the coordinate transformation from the nominal focusing region to the actual focusing region includes a spatial dilation along an axial direction of the nominal focusing region, and a scale factor of the spatial dilation (within the actual focusing region) may correspond to a ratio of the actual depth of focus to the nominal depth of focus. This is consistent with FIGS. 2 and 4, where the slope triangle 200, indicating the scale factor on the focal plane, is similar or substantially similar to a triangle with a base 132 and a height 142. Just as the axial direction can vary along a transverse extent of the nominal focusing region, the direction of the spatial dilation can vary as well. Thus, for example, a substantially cylindrically- or spherically-curved actual focusing region may be a (uniform or non-uniform) radial dilation of a substantially cylindrically- or spherically-curved nominal focusing region; a substantially ellipsoidally-curved actual focusing region may be a (uniform or non-uniform) confocal dilation of a substantially ellipsoidally-curved nominal focusing region; etc.

In some embodiments, where the focusing structure defines an f-number f/# as discussed previously, the influence of the focus-adjusting structure provides a modified relationship (as compared to equation (4)) between the f-number, the nominal depth of focus, and the resolution length l. Namely, some embodiments provide the relation $$f/\# \sim \frac{1}{s}\frac{d_A}{l}, \qquad (7)$$

where $d_A$ is the actual depth of focus and s is a scale factor for a spatial dilation applied along the axial direction. The f-number is here defined independently of the focus-adjusting structure: it is a ratio of the nominal focal path length to aperture diameter for the focusing structure (however, some embodiments provide an actual focal path length equal or substantially equal to the nominal focal path length, notwithstanding that the actual focal distance may be substantially different than the nominal focal distance). Combining equations (4) and (7) recovers the relation $d_A \sim s d_N$ discussed in the preceding paragraph.

Figure 5:
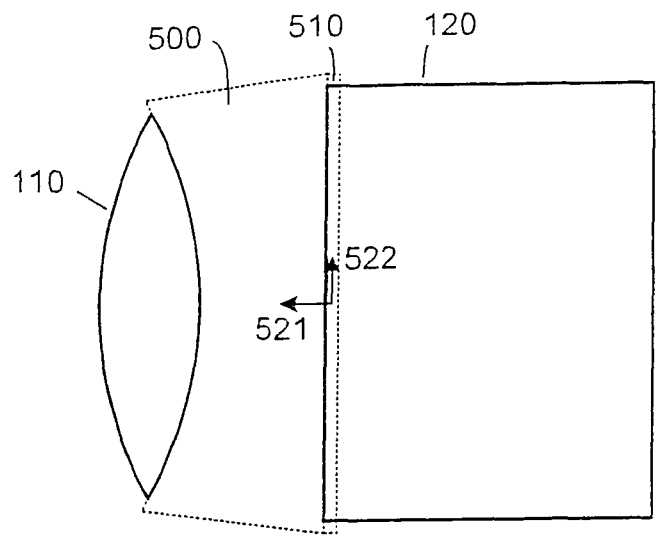
FIG. 5 depicts a focusing structure and a focus-adjusting structure with a spatial separation.
Figure 6:
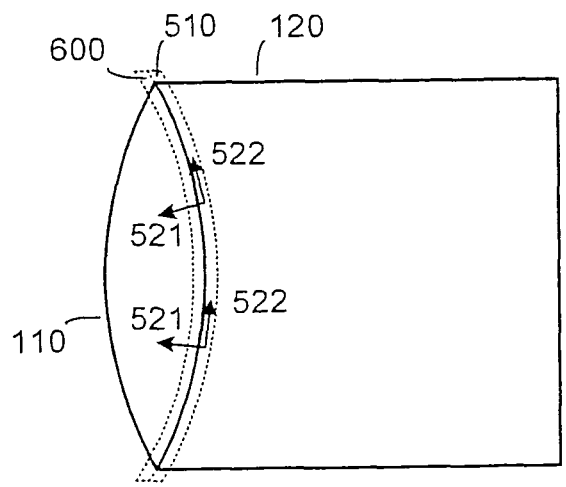
FIG. 6 depicts a focusing structure and a focus-adjusting structure without a spatial separation.

The focus-adjusting structure 120 is depicted in FIGS. 1 and 3 as a planar slab, but this is a schematic illustration and is not intended to be limiting. In various embodiments the focus-adjusting structure can be a cylindrically-, spherically-, or ellipsoidally-curved slab, or any other slab- or non-slab-like structure configured to receive the output electromagnetic energy and provide an extended depth of focus greater than the nominal depth of focus. In some embodiments, such as that depicted in FIG. 5, the focus-adjusting structure 120 and the focusing structure 110 may have a spatial separation, defining an intermediate region 500 between the structures; in other embodiments, such as that depicted in FIG. 6, the focus-adjusting structure 120 and the focusing structure 110 may define a composite or contiguous unit. Embodiments may define an input surface region (e.g. region 510 in FIGS. 5 and 6) as a surface region of the focus-adjusting structure that receives output electromagnetic radiation from the focusing structure, and this input surface region may be substantially nonreflective of the output electromagnetic radiation. For example, where the focus-adjusting structure is a transformation medium, equations (1) and (2) generally provide a medium that is substantially nonreflective. More generally, the input surface region may be substantially nonreflective by virtue of a substantial impedance-matching to the adjacent medium. When the focusing structure and a focus-adjusting structure that are spatially separated, the adjacent medium corresponds to the intermediate region (e.g. 500 in FIG. 5). When the focusing structure and a focus-adjusting structure are adjacent, the adjacent medium corresponds to an output surface region 600 (e.g. as depicted in FIG. 6) of the focusing structure.

With impedance-matching, a wave impedance of the input surface region is substantially equal to a wave impedance of the adjacent medium. The wave impedance of an isotropic medium is $$Z_0 = \sqrt{\frac{\mu}{\varepsilon}} \qquad (8)$$

while the wave impedance of a generally anisotropic medium is a tensor quantity, e.g. as defined in L. M. Barkovskii and G. N. Borzdov, "The impedance tensor for electromagnetic waves in anisotropic media," J. Appl. Spect. 20, 836 (1974) (herein incorporated by reference). In some embodiments an impedance-matching is a substantial matching of every matrix element of the wave impedance tensor (i.e. to provide a substantially nonreflective interface for all incident polarizations); in other embodiments an impedance-matching is a substantial matching of only selected matrix elements of the wave impedance tensor (e.g. to provide a substantially nonreflective interface for a selected polarization only). In some embodiments, the adjacent medium defines a permittivity $\varepsilon_1$ and a permeability $\mu_1$, where either or both parameters may be substantially unity or substantially non-unity; the input surface region defines a permittivity $\varepsilon_2$ and a permeability $\mu_2$, where either or both parameters may be substantially unity or substantially non-unity; and the impedance-matching condition implies $$\frac{\varepsilon_2}{\varepsilon_1} \cong \frac{\mu_2}{\mu_1} \qquad (9)$$

where $\varepsilon_2$ and $\mu_2$ may be tensor quantities. Defining a surface normal direction and a surface parallel direction (e.g. depicted as elements 521 and 522, respectively, in FIGS. 5 and 6), some embodiments provide a input surface region that defines: a surface normal permittivity $\varepsilon_2^\perp$ corresponding to the surface normal direction and a surface parallel permittivity $\varepsilon_2^\parallel$ corresponding to the surface parallel direction; and/or a surface normal permeability $\mu_2^\perp$ corresponding to the surface normal direction and a surface parallel permeability $\mu_2^{\parallel}$ corresponding to the surface parallel direction; and the impedance-matching condition may imply (in addition to equation (9)) one or both of the following conditions:

$$\frac{\varepsilon_2^{\perp}}{\varepsilon_1} \cong \frac{\varepsilon_1}{\varepsilon_2^{\parallel}}, \quad \frac{\mu_2^{\perp}}{\mu_1} \cong \frac{\mu_1}{\mu_2^{\parallel}}. \qquad (10)$$

Where the input surface region is a curved surface region (e.g. as in FIG. 6), the surface normal direction and the surface parallel direction can vary with position along the input surface region.

Some embodiments provide one or more electromagnetic sensors positioned within the actual focusing region of the focusing structure. In general, electromagnetic sensors, such as those depicted FIG. 1 and in other embodiments, are electromagnetic devices having a detectable response to received or absorbed electromagnetic energy. Electromagnetic sensors can include antennas (such as wire/loop antennas, horn antennas, reflector antennas, patch antennas, phased array antennas, etc.), solid-state photodetectors (such as photodiodes, CCDs, and photoresistors), vacuum photodetectors (such as phototubes and photomultipliers) chemical photodetectors (such as photographic emulsions), cryogenic photodetectors (such as bolometers), photoluminescent detectors (such as phosphor powders or fluorescent dyes/markers), MEMS detectors (such as microcantilever arrays with electromagnetically responsive materials or elements) or any other devices operable to detect and/or transduce electromagnetic energy. Some embodiments include a plurality of electromagnetic sensors positioned within the actual focusing region. A first example is a multiplet of sensors operable at a corresponding multiplet of wavelengths or wavelength bands, i.e. a first sensor operable at a first wavelength/wavelength band, a second sensor operable at a second wavelength/wavelength band, etc. A second example is a focal plane array of sensors or sensor multiplets (e.g. a Bayer or Foveon sensor). A third example is a phased array of antennas. The plurality of sensors can be axially distributed (as in FIG. 1); for example, the extended depth of focus may admit a plurality of parallel focal plane sensor arrays. As discussed earlier, a transverse extent of the sensitive area of a sensor (or sensor multiplet) can provide a resolution length in the transverse direction (e.g. 136 in FIG. 1), and may bear a relation to the depth of focus (as in equations (4) and (7)).

In some embodiments the focus-adjusting structure provides an extended depth of focus for output electromagnetic energy at a selected frequency/frequency band and/or a selected polarization. The selected frequency or frequency band may be selected from a range that includes radio frequencies, microwave frequencies, millimeter- or submillimeter-wave frequencies, THz-wave frequencies, optical frequencies (e.g. variously corresponding to soft x-rays, extreme ultraviolet, ultraviolet, visible, near-infrared, infrared, or far infrared light), etc. The selected polarization may be a particular TE polarization (e.g. where the electric field is in a particular direction transverse to the axial direction, as with s-polarized electromagnetic energy), a particular TM polarization (e.g. where the magnetic field is in a particular direction transverse to the axial direction, as with p-polarized electromagnetic energy), a circular polarization, etc. (other embodiments provide an extended depth of focus for output electromagnetic energy that is substantially the same extended depth of focus for any polarization, e.g. for unpolarized electromagnetic energy).

In other embodiments the focus-adjusting structure provides a first extended depth of focus for output electromagnetic energy at a first frequency and a second extended depth of focus for output electromagnetic energy at a second frequency, where the second extended depth of focus may be different than or substantially equal to the first extended depth of focus. For embodiments that recite first and second frequencies, the first and second frequencies may be selected from the frequency categories in the preceding paragraph. Moreover, for these embodiments, the recitation of first and second frequencies may generally be replaced by a recitation of first and second frequency bands, again selected from the above frequency categories. These embodiments providing a focus-adjusting structure operable at first and second frequencies may include a transformation medium having an adjustable response to electromagnetic radiation. For example, the transformation medium may have a response to electromagnetic radiation that is adjustable (e.g. in response to an external input or control signal) between a first response and a second response, the first response providing the first extended depth of focus for output electromagnetic energy at the first frequency, and the second response providing the second extended depth of focus for output electromagnetic energy at the second frequency. A transformation medium with an adjustable electromagnetic response may be implemented with variable metamaterials, e.g. as described in R. A. Hyde et al, supra. Other embodiments of a focus-adjusting structure operable at first and second frequencies may include transformation medium having a frequency-dependent response to electromagnetic radiation, corresponding to frequency-dependent constitutive parameters. For example, the frequency-dependent response at a first frequency may provide a first extended depth of focus for output electromagnetic energy at the first frequency, and the frequency-dependent response at a second frequency may provide second extended depth of focus for output electromagnetic energy at the second frequency. A transformation medium having a frequency-dependent response to electromagnetic radiation can be implemented with artificially-structured materials such as metamaterials; for example, a first set of metamaterial elements having a response at the first frequency may be interleaved with a second set of metamaterial elements having a response at the second frequency.

In some embodiments the focusing structure provides a first nominal depth of focus for output electromagnetic energy at a first frequency and a second nominal depth of focus for output electromagnetic energy at a second frequency, where the second nominal depth of focus may be different than or substantially equal to the first nominal depth of focus. Examples of focusing structures providing different first and second nominal depths of focus include: dichroic lenses or mirrors, frequency-selective surfaces, diffractive gratings; metamaterials having a frequency-dependent response; etc.; or, generally, any focusing structure having a chromatic dispersion or aberration. A focusing structure that provides first and second nominal depths of focus for output electromagnetic energy at first and second frequencies can be combined with a focus-adjusting structure that provides first and second extended depths of focus for output electromagnetic energy at the first and second frequencies. A particular embodiment provides different first and second nominal depths of focus but substantially equal first and second extended depths of focus (thus, for example, compensating for a chromatic aberration of the focusing structure).

Figure 7:
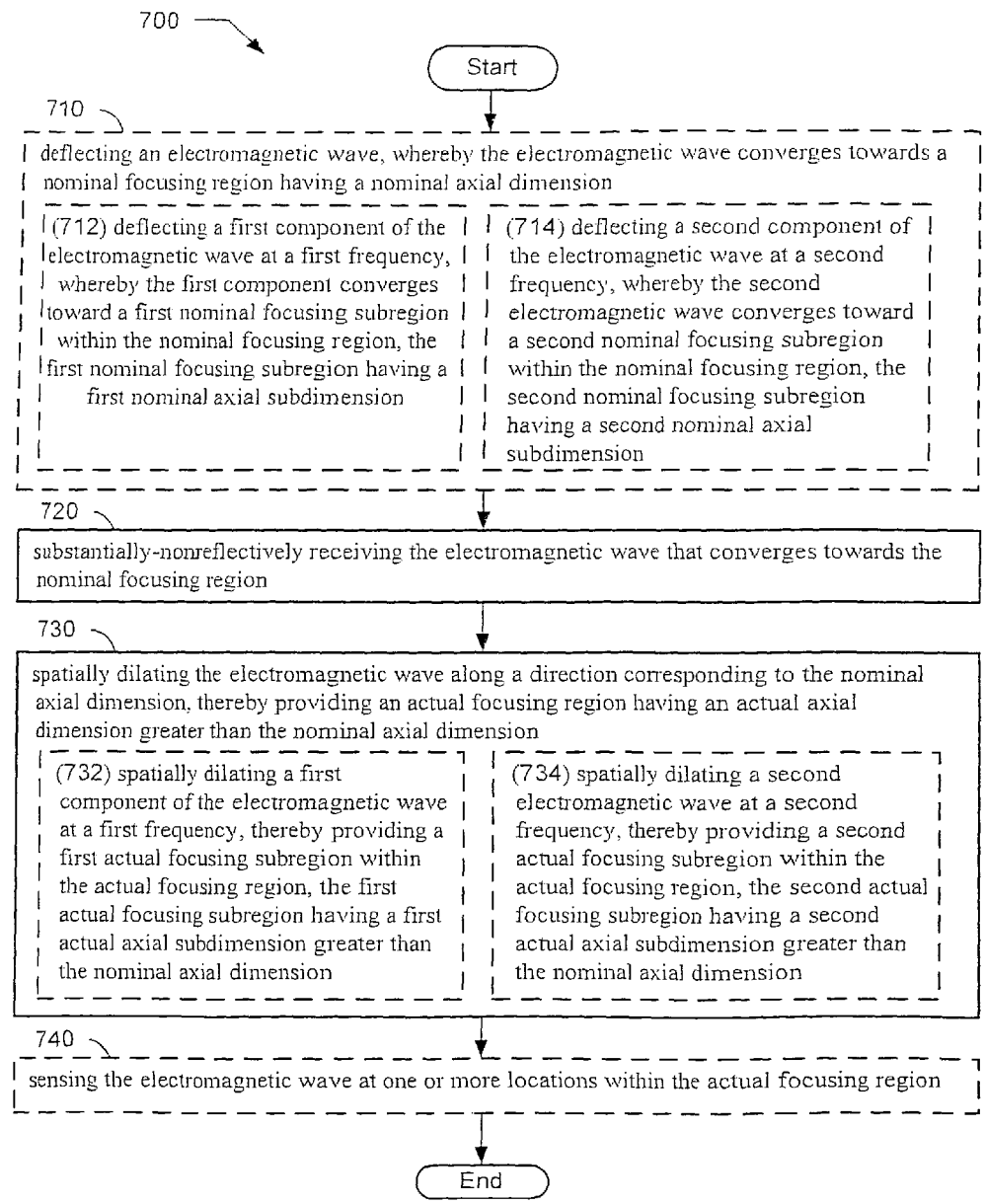
FIG. 7 depicts a first process flow.

An illustrative embodiment is depicted as a process flow diagram in FIG. 7. Flow 700 optionally includes operation 710—deflecting an electromagnetic wave, whereby the electromagnetic wave converges towards a nominal focusing region having a nominal axial dimension. For example, a focusing structure, such as that depicted as element 110 in FIGS. 1 and 3, deflects input electromagnetic energy 102, whereby output electromagnetic energy 103 converges towards a nominal focusing region 130. Operation 710 optionally includes sub-operation 712—deflecting a first component of the electromagnetic wave at a first frequency, whereby the first component converges toward a first nominal focusing subregion within the nominal focusing region, the first nominal focusing subregion having a first nominal axial subdimension—and sub-operation 714—deflecting a second component of the electromagnetic wave at a second frequency, whereby the second electromagnetic wave converges toward a second nominal focusing subregion within the nominal focusing region, the second nominal focusing subregion having a second nominal axial subdimension. For example, a focusing structure may provide a first nominal depth of focus for output electromagnetic energy at a first frequency and a second nominal depth of focus for output electromagnetic energy at a second frequency (e.g. where the focusing structure has a chromatic dispersion or aberration). Flow 700 includes operation 720—substantially-nonreflectively receiving the electromagnetic wave that converges towards the nominal focusing region. For example, a focus-adjusting structure, such as that depicted as element 120 in FIGS. 5 and 6, may include an input surface region 510 that is substantially nonreflective of input electromagnetic energy incident upon the input surface region from an adjacent region (e.g. where the input surface region is substantially impedance-matched to the adjacent region). Flow 700 further includes operation 730—spatially dilating the electromagnetic wave along a direction corresponding to the nominal axial dimension, thereby providing an actual focusing region having an actual axial dimension greater than the nominal axial dimension. For example, a focus-adjusting structure, such as that depicted as element 120 in FIGS. 1 and 3, may receive output electromagnetic energy 103 and influence the propagation thereof, whereby the output electromagnetic energy converges towards an actual focusing region 140 instead of a nominal focusing region 130; and the focus-adjusting structure may include a transformation medium corresponding to a coordinate transformation that includes a spatial dilation, e.g. as depicted in FIGS. 2 and 4. Operation 730 optionally includes sub-operation 732—spatially dilating a first component of the electromagnetic wave at a first frequency, thereby providing a first actual focusing subregion within the actual focusing region, the first actual focusing subregion having a first actual axial subdimension greater than the nominal axial dimension—and sub-operation 734—spatially dilating a second electromagnetic wave at a second frequency, thereby providing a second actual focusing subregion within the actual focusing region, the second actual focusing subregion having a second actual axial subdimension greater than the nominal axial dimension. For example, a focus-adjusting structure may provide a first extended depth of focus for output electromagnetic energy at a first frequency and a second extended depth of focus for output electromagnetic energy at a second frequency, where the second extended depth of focus may be different than or substantially equal to the first extended depth of focus; and the focus-adjusting structure operable at first and second frequencies may include afransformation medium having an adjustable response to electromagnetic radiation, or a transformation medium having a frequency-dependent response to electromagnetic radiation. Flow 700 optionally further includes operation 740—sensing the electromagnetic wave at one or more locations within the actual focusing region. For example, one or more electromagnetic sensors, such as those depicted as elements 150 in FIG. 1, may be positioned within an actual focusing region 140 to detect/receive/absorb the output electromagnetic energy 103.

Figure 8:
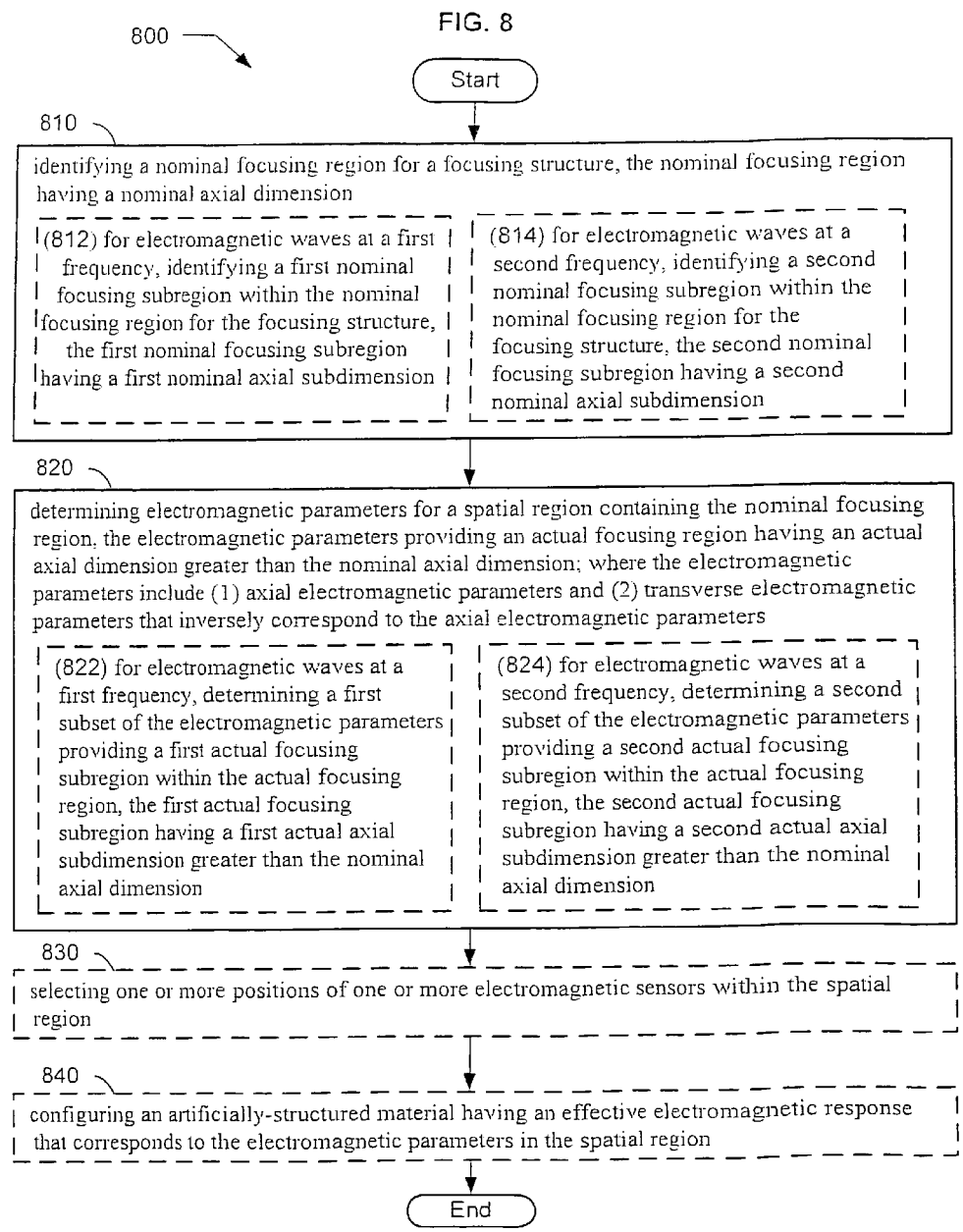
FIG. 8 depicts a second process flow.

Another illustrative embodiment is depicted as a process flow diagram in FIG. 8. Flow 800 includes operation 810—identifying a nominal focusing region for a focusing structure, the nominal focusing region having a nominal axial dimension. For example, a nominal focusing region is depicted as region 130 in FIGS. 1 and 3. The nominal focusing region may correspond to a region centered on a nominal focal plane (or non-planar nominal focal surface) having a thickness corresponding to a nominal depth of focus. Operation 810 optionally includes sub-operation 812—for electromagnetic waves at a first frequency, identifying a first nominal focusing subregion within the nominal focusing region for the focusing structure, the first nominal focusing subregion having a first nominal axial subdimension—and sub-operation 814—for electromagnetic waves at a second frequency, identifying a second nominal focusing subregion within the nominal focusing region for the focusing structure, the second nominal focusing subregion having a second nominal axial subdimension. For example, the focusing structure may have a chromatic dispersion or aberration, whereby the nominal focusing region depends upon the frequency of the input electromagnetic energy. Flow 800 further includes operation 820—determining electromagnetic parameters for a spatial region containing the nominal focusing region, the electromagnetic parameters providing an actual focusing region having an actual axial dimension greater than the nominal axial dimension; where the electromagnetic parameters include (1) axial electromagnetic parameters and (2) transverse electromagnetic parameters that inversely correspond to the axial electromagnetic parameters. For example, the spatial region can be a volume that encloses a focus-adjusting structure, such as that depicted as element 120 in FIGS. 1 and 3, and the determined electromagnetic parameters are the electromagnetic parameters of the focus-adjusting structure. The focus-adjusting structure may include a transformation medium, where the determined electromagnetic parameters satisfy or substantially satisfy equations (1) and (2), as described above; or, the determined electromagnetic parameters may be reduced parameters (as discussed earlier) where the corresponding non-reduced parameters satisfy equations (1) and (2). In some embodiments, the determining of the electromagnetic parameters includes: determining a coordinate transformation (such as those depicted in FIGS. 2 and 4); then determining electromagnetic parameters for a corresponding transformation medium (e.g. with equations (1) and (2)); then, optionally, reducing the electromagnetic parameters (e.g. to at least partially substitute a magnetic response for an electromagnetic response, or vice versa, as discussed above). Operation 820 optionally includes sub-operation 822—for electromagnetic waves at a first frequency, determining a first subset of the electromagnetic parameters providing a first actual focusing subregion within the actual focusing region, the first actual focusing subregion having a first actual axial subdimension greater than the nominal axial dimension—and sub-operation 824—for electromagnetic waves at a second frequency, determining a second subset of the electromagnetic parameters providing a second actual focusing subregion within the actual focusing region, the second actual focusing subregion having a second actual axial subdimension greater than the nominal axial dimension. For example, the determined electromagnetic parameters may be the electromagnetic parameters of a focus-adjusting structure having a first extended depth of focus for output electromagnetic energy at a first frequency and a second extended depth of focus for output electromagnetic energy at a second frequency. The focus-adjusting structure may include a transformation medium having an adjustable response to electromagnetic radiation, e.g. adjustable between a first response, corresponding to the first subset of the electromagnetic parameters, and a second response, corresponding to the second subset of the electromagnetic parameters. Or, the focus-adjusting structure may include a transformation medium having a frequency-dependent response to electromagnetic radiation, corresponding to frequency-dependent constitutive parameters, so that the first and second subsets of the electromagnetic parameters are values of the frequency-dependent constitutive parameters at the first and second frequencies, respectively. Flow 800 optionally further includes operation 830—selecting one or more positions of one or more electromagnetic sensors within the spatial region. For example, electromagnetic sensors may be positioned in a phased array, a focal plane array, an axially-distributed arrangement, etc. Flow 800 optionally further includes operation 840—configuring an artificially-structured material having an effective electromagnetic response that corresponds to the electromagnetic parameters in the spatial region. For example, the configuring may include configuring the structure(s) and/or the materials that compose a photonic crystal or a metamaterial. Operation 840 optionally includes determining an arrangement of a plurality of electromagnetically responsive elements having a plurality of individual responses, the plurality of individual responses composing the effective electromagnetic response. For example, the determining may include determining the positions, orientations, and individual response parameters (spatial dimensions, resonant frequencies, linewidths, etc.) of a plurality of metamaterial elements such as split-ring resonators, wire or nanowire pairs, etc. Operation 840 optionally includes configuring at least one electromagnetically-responsive structure to arrange a plurality of distributed electromagnetic responses, the plurality of distributed electromagnetic responses composing the effective electromagnetic response. For example, the configuring may include configuring the distribution of loads and interconnections on a transmission line network, configuring an arrangement of layers in a layered metamaterial, configuring a pattern of etching or deposition (as with a nano-fishnet structure), etc.

Figure 9:
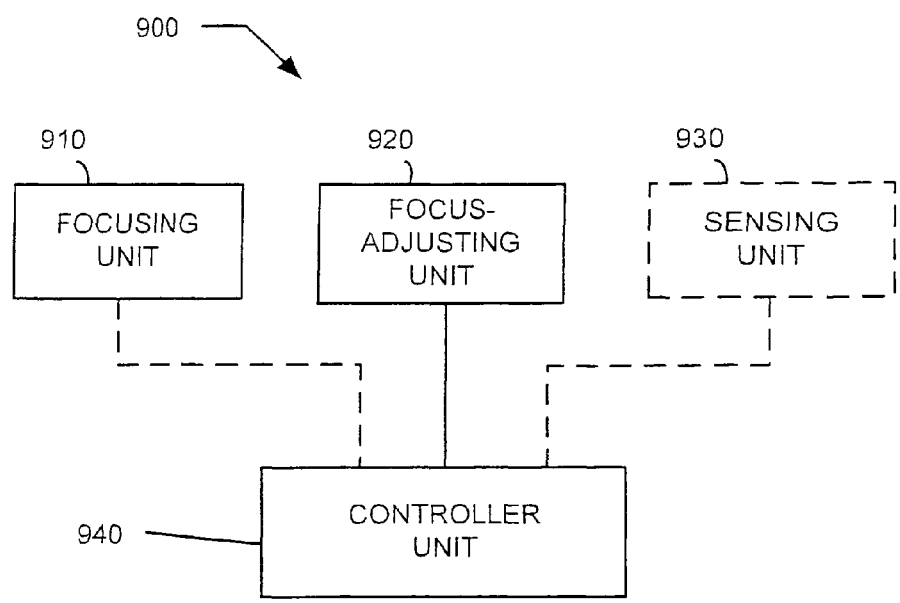
FIG. 9 depicts a system that includes a focus-adjusting unit and a controller.

With reference now to FIG. 9, an illustrative embodiment is depicted as a system block diagram. The system 900 includes a focusing unit 910 optionally coupled to a controller unit 940. The focusing unit 910 may include a focusing structure such as that depicted as element 110 in FIGS. 1 and 3. The focusing structure may be a variable or adaptive focusing structure, such as an electro-optic lens, a liquid or liquid-crystal lens, a mechanically-adjustable lens assembly, a variable metamaterial lens, or any other variable or adaptive focusing structure responsive to one or more control inputs to vary or adapt one or more focusing characteristics (focal length, aperture size, nominal depth of focus, operating frequency/frequency band, operating polarization, etc.) of the focusing structure; and the controller unit 940 may include control circuitry that provides one or more control inputs to the variable or adaptive focusing structure. The system 900 further includes a focus-adjusting unit 920 coupled to the controller unit 940. The focus-adjusting unit 920 may include a focus-adjusting structure such as that depicted as element 120 in FIGS. 1 and 3. The focus-adjusting structure may be a variable focus-adjusting structure, such as a variable metamaterial responsive to one or more control inputs to vary one or more focus-adjusting characteristics (extended depth of focus, operating frequency/frequency band, operating polarization, effective coordinate transformation for a transformation medium, etc.); and the controller unit 940 may include control circuitry that provides one or more control inputs to the variable focus-adjusting structure. The controller unit 940 may include circuitry for coordinating or synchronizing the operation of the focusing unit 910 and the focus-adjusting unit 920; for example, the controller unit 940 may vary one or more focusing characteristics of a focusing structure (e.g. vary an operating frequency of the focusing structure from a first frequency to a second frequency) and correspondingly vary one or more focus-adjusting characteristics of a focus-adjusting structure (e.g. vary an operating frequency of the focus-adjusting structure from a first frequency to a second frequency). The system 900 optionally further includes a sensing unit 930 that may include one or more sensors, such as those depicted as elements 150 in FIG. 1, and associated circuitry such as receiver circuitry, detector circuitry, and/or signal processing circuitry. The sensing unit 930 is optionally coupled to the controller unit 940, and in some embodiments the controller unit 940 includes circuitry responsive to sensor data (from the sensor unit 930) to vary the focusing characteristics of a focusing structure and/or vary the focus-adjusting characteristics of a focus-adjusting structure. As a first example, the controller unit 940 may include circuitry responsive to the sensor data to identify a frequency of received energy, adjust the focusing unit 910 to an operating frequency substantially equal to the frequency of received energy, and/or adjust the focus-adjusting unit 920 to an operating frequency substantially equal to the frequency of received energy. As a second example, the controller unit may include circuitry responsive to the sensor data to identify an actual focusing region (e.g. depicted as region 140 in FIGS. 1 and 3) and vary the actual focusing region by varying the focusing characteristics of a focusing structure and/or varying the focus-adjusting characteristics of a focus-adjusting structure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents; foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g. steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   identifying a nominal focusing region for a focusing structure, the nominal focusing region having a nominal axial dimension; and
   determining electromagnetic parameters for a spatial region containing the nominal focusing region, the electromagnetic parameters providing an actual focusing region having an actual axial dimension greater than the nominal axial dimension; where the electromagnetic parameters include:
   axial electromagnetic parameters; and
   transverse electromagnetic parameters that inversely correspond to the axial electromagnetic parameters.

2. The method of claim 1, wherein the actual focusing region is an actual focusing region for polarized electromagnetic waves.

3. The method of claim 2, wherein the actual focusing region for polarized electromagnetic waves is an actual focusing region for TE-polarized electromagnetic waves.

4. The method of claim 2, wherein the actual focusing region for polarized electromagnetic waves is an actual focusing region for TM-polarized electromagnetic waves.

5. The method of claim 1, wherein the actual focusing region is an actual focusing region for electromagnetic waves at a first frequency.

6. The method of claim 5, where the first frequency is an optical frequency.

7. The method of claim 6, wherein the optical frequency corresponds to a visible wavelength.

8. The method of claim 6, wherein the optical frequency corresponds to an infrared wavelength.

9. The method of claim 5, wherein the first frequency is a radio frequency.

10. The method of claim 9, wherein the radio frequency is a microwave frequency.

11. The method of claim 5, wherein the first frequency is a millimeter-wave frequency.

12. The method of claim 5, wherein the first frequency is a submillimeter-wave frequency.

13. The method of claim 1, wherein the determining of the electromagnetic parameters includes:
   for electromagnetic waves at a first frequency, determining a first subset of the electromagnetic parameters providing a first actual focusing subregion within the actual focusing region, the first actual focusing subregion having a first actual axial subdimension greater than the nominal axial dimension; and
   for electromagnetic waves at a second frequency, determining a second subset of the electromagnetic parameters providing a second actual focusing subregion within the actual focusing region, the second actual focusing subregion having a second actual axial subdimension greater than the nominal axial dimension.

14. The method of claim 13, wherein the second actual axial subdimension is different than the first actual axial subdimension.

15. The method of claim 13, wherein the second actual axial subdimension is substantially equal to the first actual axial subdimension.

16. The method of claim 1, wherein the identifying includes:
   for electromagnetic waves at a first frequency, identifying a first nominal focusing subregion within the nominal focusing region for the focusing structure, the first nominal focusing subregion having a first nominal axial subdimension; and
   for electromagnetic waves at a second frequency, identifying a second nominal focusing subregion within the nominal focusing region for the focusing structure, the second nominal focusing subregion having a second nominal axial subdimension.

17. The method of claim 16, wherein the determining of the electromagnetic parameters includes:
   for the electromagnetic waves at the first frequency, determining a first subset of the electromagnetic parameters providing a first actual focusing subregion within the actual focusing region, the first actual focusing subregion having a first actual axial subdimension greater than the nominal axial dimension; and
   for the electromagnetic waves at the second frequency, determining a second subset of the electromagnetic parameters providing a second actual focusing subregion within the actual focusing region, the second actual focusing subregion having a second actual axial subdimension greater than the nominal axial dimension.

18. The method of claim 17, wherein the second nominal axial subdimension is different than the first nominal axial subdimension.

19. The method of claim 18, wherein the second actual axial subdimension is substantially equal to the first actual axial subdimension.

20. The method of claim 17, wherein the second nominal axial subdimension is substantially equal to the first nominal axial subdimension.

21. The method of claim 1, wherein the focusing structure includes a refractive structure.

22. The method of claim 1, wherein the focusing structure includes a reflective structure.

23. The method of claim 1, wherein the focusing structure includes a diffractive structure.

24. The method of claim 1, wherein the focusing structure includes at least a portion of an antenna.

25. The method of claim 1, wherein the focusing structure includes at least a portion of a waveguide.

26. The method of claim 1, wherein the electromagnetic parameters define a negative index of refraction within at least a portion of the spatial region.

27. The method of claim 1, wherein the focusing structure defines an axial direction, and the axial electromagnetic parameters correspond to the axial direction.

28. The method of claim 27, wherein the axial direction corresponds to an optical axis of the focusing structure.

29. The method of claim 27, wherein the axial direction corresponds to the nominal axial dimension.

30. The method of claim 29, wherein the nominal focusing region is a first substantially planar slab and the nominal axial dimension is a thickness of the first substantially planar slab.

31. The method of claim 30, wherein the actual focusing region is a second substantially planar slab substantially parallel to the first substantially planar slab, and the actual axial dimension is a thickness of the second substantially planar slab.

32. The method of claim 29, wherein the second substantially planar slab encloses the first substantially planar slab.

33. The method of claim 29, wherein the nominal focusing region is at least a portion of a first curved slab and the nominal axial dimension is a thickness of the first curved slab.

34. The method of claim 33, wherein the actual focusing region is at least a portion of a second curved slab, the first and second curved slabs having a substantially similar curvature, and the actual axial dimension is a thickness of the second curved slab.

35. The method of claim 34, wherein the second curved slab encloses the first curved slab.

36. The method of claim 33, wherein the first curved slab is a substantially cylindrical shell and the nominal axial dimension is a radial dimension of the substantially cylindrical shell.

37. The method of claim 33, wherein the first curved slab is a substantially spherical shell and the nominal axial dimension is a radial dimension of the substantially spherical shell.

38. The method of claim 33, wherein the first curved slab is a substantially ellipsoidal shell.

39. The method of claim 27, wherein the transverse electromagnetic parameters correspond to a transverse direction, the transverse direction being substantially perpendicular to the axial direction.

40. The method of claim 27, wherein the transverse electromagnetic parameters include first transverse electromagnetic parameters corresponding to a first transverse direction and second transverse electromagnetic parameters corresponding to a second transverse direction, and further wherein the first transverse direction, the second transverse direction, and the axial direction are substantially mutually perpendicular.

41. The method of claim 40, wherein the first transverse electromagnetic parameters are substantially equal to the second transverse electromagnetic parameters.

42. The method of claim 1, wherein the focusing structure and the spatial region have a physical separation.

43. The method of claim 42, wherein the physical separation defines an intermediate region between the focusing structure and the spatial region, and wherein the spatial region includes an input surface region that is substantially nonreflective of electromagnetic energy incident upon the input surface region from the intermediate region.

44. The method of claim 42, wherein the spatial region is immediately adjacent to the focusing structure.

45. The method of claim 1, wherein the electromagnetic parameters correspond to an effective coordinate transformation that maps the actual focusing region to the nominal focusing region.

46. The method of claim 1, further comprising:
configuring an artificially-structured material having an effective electromagnetic response that corresponds to the electromagnetic parameters in the spatial region.

47. The method of claim 46, wherein the artificially-structured material includes a photonic crystal.

48. The method of claim 46, wherein the configuring includes:
determining an arrangement of a plurality of electromagnetically responsive elements having a plurality of individual responses, the plurality of individual responses composing the effective electromagnetic response.

49. The method of claim 48, wherein the electromagnetically responsive elements include printed circuit elements.

50. The method of claim 48, wherein the electromagnetically responsive elements include subwavelength elements having spatial extents substantially less than a free space wavelength corresponding to a frequency of the input electromagnetic energy.

* * * * *

UNITED STATES PATENT AND TRADEMARK OFFICE
CERTIFICATE OF CORRECTION

PATENT NO. : 8,773,777 B2  
APPLICATION NO. : 12/657055  
DATED : July 8, 2014  
INVENTOR(S) : Jeffrey A. Bowers et al.

Page 1 of 1

It is certified that error appears in the above-identified patent and that said Letters Patent is hereby corrected as shown below:

In the Claims:

Column 22, Line 58, Claim 32:
"The method of claim 29, wherein the" should read --The method of claim 31, wherein the--

Signed and Sealed this
Eleventh Day of November, 2014

Michelle K. Lee
*Deputy Director of the United States Patent and Trademark Office*